(12) United States Patent
Shelby et al.

(10) Patent No.: US 8,304,499 B2
(45) Date of Patent: *Nov. 6, 2012

(54) TRANSPARENT POLYMER BLENDS AND ARTICLES PREPARED THEREFROM

(75) Inventors: Marcus David Shelby, Fall Branch, TN (US); Wesley Raymond Hale, Kingsport, TN (US); Thomas Joseph Pecorini, Kingsport, TN (US); Martin Emerson Rogers, Blacksburg, VA (US); Spencer Allen Gilliam, Kingsport, TN (US); Michael Duane Cliffton, Kingsport, TN (US); Mark Edward Stewart, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,334

(22) Filed: Apr. 29, 2011

(65) Prior Publication Data
US 2011/0200774 A1 Aug. 18, 2011

Related U.S. Application Data

(63) Continuation of application No. 11/363,375, filed on Feb. 27, 2006, now Pat. No. 7,968,164, and a continuation of application No. 11/363,374, filed on Feb. 27, 2006, now Pat. No. 7,964,258.

(60) Provisional application No. 60/657,746, filed on Mar. 2, 2005, provisional application No. 60/657,747, filed on Mar. 2, 2005.

(51) Int. Cl.
- B29D 22/00 (2006.01)
- B65D 23/00 (2006.01)
- C08L 57/00 (2006.01)
- C08L 77/00 (2006.01)

(52) U.S. Cl. ...... 525/425; 428/34.1; 428/35.2; 428/35.7; 428/35.8; 428/35.9; 428/36.6; 428/36.7; 428/474.4; 428/475.2; 428/475.5; 525/420; 525/432; 525/433

(58) Field of Classification Search ........... 525/420, 525/425, 432, 433; 428/34.1, 35.2, 35.7, 428/35.8, 35.9, 36.6, 36.7, 474.4, 475.2, 428/475.5
See application file for complete search history.

(56) References Cited

U.S. PATENT DOCUMENTS

| | | |
|---|---|---|
| 2,999,835 A | 9/1961 | Goldberg |
| 3,028,365 A | 4/1962 | Schnell et al. |
| 3,030,335 A | 4/1962 | Goldberg |
| 3,153,008 A | 10/1964 | Fox |
| 3,313,777 A | 4/1967 | Elam et al. |
| 3,317,466 A | 5/1967 | Caldwell et al. |
| 3,360,547 A | 12/1967 | Wilson et al. |
| 3,843,479 A | 10/1974 | Matsunami et al. |
| 4,133,802 A | 1/1979 | Hachiboshi et al. |
| 4,321,355 A | 3/1982 | Maresca et al. |
| 4,374,239 A | 2/1983 | Berger et al. |
| 4,427,614 A | 1/1984 | Barham et al. |
| 4,430,484 A | 2/1984 | Quinn |
| 4,474,999 A | 10/1984 | Mark et al. |
| 4,501,781 A | 2/1985 | Kushida et al. |
| 4,581,288 A | 4/1986 | Barnhart et al. |
| 4,598,130 A | 7/1986 | Robeson et al. |
| 4,816,308 A | 3/1989 | Shimizu et al. |
| 4,837,115 A | 6/1989 | Igarashi et al. |
| 4,880,592 A | 11/1989 | Martini et al. |
| 4,929,476 A | 5/1990 | Gibbons et al. |
| 4,937,134 A | 6/1990 | Schrenk et al. |
| 4,981,739 A | 1/1991 | Gibbons et al. |
| 4,983,431 A | 1/1991 | Gibbons et al. |
| 5,034,252 A | 7/1991 | Nilsson et al. |
| 5,034,502 A | 7/1991 | Hirose et al. |
| 5,122,905 A | 6/1992 | Wheatley et al. |
| 5,239,020 A | 8/1993 | Morris |
| 5,262,511 A | 11/1993 | Caringi et al. |
| 5,268,219 A | 12/1993 | Harada et al. |
| 5,290,631 A | 3/1994 | Fleury et al. |
| 5,340,884 A | 8/1994 | Mills et al. |
| 5,489,665 A | 2/1996 | Yamato et al. |
| 5,494,992 A | 2/1996 | Kanno et al. |

(Continued)

FOREIGN PATENT DOCUMENTS

EP  0 301 719 A1  2/1989

(Continued)

OTHER PUBLICATIONS

Hu, Y.S., et al, "Improving transparency of stretched PET/MXD6 blends by modifying PET with isophthalate", Department of Macromolecular Science, Center for Applied Polymer Research, Polymer 46 (2005) 5202-5210.

(Continued)

*Primary Examiner* — Ana Woodward

(74) *Attorney, Agent, or Firm* — Jennifer R. Knight; Eric Middlemas

(57) ABSTRACT

Disclosed are polymer compositions having high transparency and low haze comprising immiscible blends of one or more thermoplastic polymers selected from polyesters, polycarbonates, and polyarylates, and a copolyamide or a transamidized, homogeneous blend of a least two polyamides. The components of the immiscible blend which have refractive indices which differ by about 0.006 to about −0.0006. The small difference in the refractive indices enable the incorporation of regrind into the polymer composition to produce transparent shaped articles. The blends of the present invention are useful in producing shaped articles such as, for example, sheeting, films, tubes, bottles, preforms and profiles. These articles may have one or more layers and can exhibit improved excellent barrier properties and good melt processability while retaining excellent mechanical properties. Metal catalysts can be incorporated into the compositions to produce oxygen-scavenging compositions.

19 Claims, No Drawings

U.S. PATENT DOCUMENTS

| | | | |
|---|---|---|---|
| 5,498,688 | A | 3/1996 | Oshino et al. |
| 5,552,469 | A | 9/1996 | Beall et al. |
| 5,578,672 | A | 11/1996 | Beall et al. |
| 5,650,469 | A | 7/1997 | Long et al. |
| 5,942,585 | A | 8/1999 | Scott et al. |
| 5,989,663 | A | 11/1999 | Morris et al. |
| 6,005,059 | A | 12/1999 | Scott et al. |
| 6,011,124 | A | 1/2000 | Scott et al. |
| 6,022,941 | A | 2/2000 | Mestanza et al. |
| 6,037,424 | A | 3/2000 | Scott et al. |
| 6,043,322 | A | 3/2000 | Scott et al. |
| 6,160,082 | A | 12/2000 | Lin et al. |
| 6,211,309 | B1 | 4/2001 | McIntosh et al. |
| 6,239,210 | B1 | 5/2001 | Kim et al. |
| 6,239,233 | B1 | 5/2001 | Bell et al. |
| 6,387,996 | B1 | 5/2002 | Lan et al. |
| 6,444,283 | B1 | 9/2002 | Turner et al. |
| 6,528,560 | B2 | 3/2003 | Buhler |
| 6,656,993 | B2 | 12/2003 | Akkapeddi et al. |
| 6,685,861 | B2 | 2/2004 | Akkapeddi et al. |
| 6,689,437 | B1 | 2/2004 | Ubara et al. |
| 6,699,549 | B1 | 3/2004 | Ueyama et al. |
| 6,740,698 | B2 | 5/2004 | Akkapeddi et al. |
| 6,756,444 | B2 | 6/2004 | Akkapeddi et al. |
| 6,896,966 | B2 | 5/2005 | Crawford et al. |
| 6,933,055 | B2 | 8/2005 | Share et al. |
| 6,991,837 | B2 | 1/2006 | Klein et al. |
| 7,022,764 | B2 | 4/2006 | Murray |
| 7,053,143 | B2 | 5/2006 | Mori et al. |
| 7,087,682 | B2 | 8/2006 | Tadros et al. |
| 7,186,464 | B2 | 3/2007 | Laplante et al. |
| 7,230,067 | B2 | 6/2007 | Otaki |
| 7,288,586 | B2 | 10/2007 | Stewart et al. |
| 7,375,154 | B2 | 5/2008 | Stafford et al. |
| 7,427,430 | B2 | 9/2008 | Rhee et al. |
| 7,462,684 | B2 | 12/2008 | Hale et al. |
| 7,641,950 | B2 | 1/2010 | Stafford et al. |
| 7,786,252 | B2 | 8/2010 | Hale et al. |
| 7,955,533 | B2 | 6/2011 | Hale et al. |
| 7,955,674 | B2 | 6/2011 | Hale et al. |
| 7,959,836 | B2 | 6/2011 | Hale et al. |
| 7,959,998 | B2 | 6/2011 | Hale et al. |
| 7,964,258 | B2 | 6/2011 | Hale et al. |
| 7,968,164 | B2 | 6/2011 | Hale et al. |
| 2002/0111428 | A1 | 8/2002 | Gaggar et al. |
| 2005/0009976 | A1 | 1/2005 | Akkapeddi et al. |
| 2005/0159526 | A1 | 7/2005 | Bernard et al. |
| 2005/0181155 | A1 | 8/2005 | Share et al. |
| 2005/0222345 | A1 | 10/2005 | Nakayama et al. |
| 2006/0004151 | A1 | 1/2006 | Shaikh et al. |
| 2006/0148957 | A1 | 7/2006 | Stewart et al. |
| 2006/0199871 | A1 | 9/2006 | Hale et al. |
| 2006/0234073 | A1 | 10/2006 | Hale et al. |
| 2008/0009574 | A1 | 1/2008 | Huenefeld et al. |
| 2008/0255280 | A1 | 10/2008 | Sims et al. |

FOREIGN PATENT DOCUMENTS

| | | |
|---|---|---|
| EP | 0 318 964 A2 | 6/1989 |
| EP | 0 378 856 A1 | 12/1989 |
| EP | 0 404 463 A2 | 6/1990 |
| EP | 0 426 636 A2 | 5/1991 |
| EP | 0 544 008 A1 | 6/1993 |
| EP | 0 580 360 A1 | 1/1994 |
| EP | 1 239 008 A1 | 9/2002 |
| EP | 1 262 524 A2 | 12/2002 |
| EP | 1 396 337 A1 | 3/2004 |
| EP | 0 964 031 B1 | 4/2004 |
| EP | 1 475 308 A1 | 11/2004 |
| EP | 1 504 999 A1 | 2/2005 |
| GB | 962913 | 7/1964 |
| GB | 1 130 558 | 10/1968 |
| GB | 1 141 981 | 2/1969 |
| JP | 50-10196 B2 | 4/1975 |
| JP | 62-119256 A | 5/1987 |
| JP | 02198820 | 8/1990 |
| JP | 4-197634 A | 7/1992 |
| JP | 2001252560 A | 9/2001 |
| JP | 2002-69276 A | 3/2002 |
| JP | 2002-88174 A | 3/2002 |
| JP | 2002348482 A | 12/2002 |
| JP | 2003-192882 A | 7/2003 |
| JP | 2004-182743 A | 7/2004 |
| JP | 2004-285194 A | 10/2004 |
| JP | 2005-15791 A | 1/2005 |
| JP | 2005-319771 A | 11/2005 |
| WO | WO 93/11190 | 6/1993 |
| WO | WO 95/16554 | 6/1995 |
| WO | 9618685 | 6/1996 |
| WO | WO 98/39388 | 9/1998 |
| WO | WO 01/09245 A1 | 2/2001 |
| WO | WO 01/85824 | 11/2001 |
| WO | WO 03/066329 A1 | 8/2003 |
| WO | WO 2005/075190 A1 | 8/2005 |
| WO | WO 2006/025827 A1 | 3/2006 |

OTHER PUBLICATIONS

Dhoot, S. N. et al, "Table 5. Oxygen and Carbon Dioxide Permeabilities of Various High and Moderate Barrier Polymers", Encyclopedia of Polymer Science and Technology, 3$^{rd}$ ed., v.5, John Wiley & Sons, 2003, III-2.

Maruhashi, Yoshitsugu et al, "Transparency of Polymer Blends", Polymer Engineering and Science, Nov. 2001, vol. 41, No. 11, pp. 1987-1995.

Prattipati, V., et al, "Effect of Compatibilization on the Oxygen-Barrier Properties of Poly(ethylene terephthalate)/Poly(m-xylylene adipamide) Blends", Journal of Applied Polymer Science, vol. 97, 2005, pp. 1361-1370.

Prattipati, V., et al, "Improving the Transparency of Stretched Poly(ethylene terephthalate)/Polyamide Blends", Journal of Applied Polymer Science, vol. 99, pp. 225-235, (2006).

Kalika, et al, "The Influence of Transamidation on the Crystallization and Morphology of Crystalline-Amorphous Polyamide Blends", Department of Chemical and Materials Engineering, University of Kentucky, Lexington, KY, (1998).

Y. Takeda, et al., *Polymer*, 1992 vol. 33, p. 3394.

Biangardi et al., *Die Angew. Makromole. Chemie*, 183,221 (1990).

L. Bohn, Polmyer Handbook, 2$^{nd}$ ed., Wiley Interscience, New York (1975), pp. 111-211.

Tse et al., J. Appl. Poly. Sci., 42, 1205 (1991).

Lin et al., Polym. Engr. Sci., 37, 344 (1992).

W. J. MacKnight et al, *Polymer Blends*, vol. 1, pp. 185-200, (1978).

Groeninckx et al., Macromolecules 1996, 29, pp. 1041-1045.

Groeninckx et al., Macromolecules 1996, 29, pp. 1046-1050.

International Search Report dated Jun. 28, 2006, for PCT/US2006/007532.

International Search Report dated Jun. 28, 2006, for PCT/US2006/007531.

International Search Report dated Jul. 12, 2006, for PCT/US2006/007489.

International Search Report dated Jul. 12, 2006, for PCT/US2006/007439.

International Search Report dated Jul. 11, 2006, for PCT/US2006/007535.

International Search Report dated Dec. 5, 2006 for PCT/US2006/011909.

International Search Report dated Nov. 7, 2006 for PCT/US2006/011693.

International Search Report dated Nov. 29, 2006 for PCT/US2006/012074.

International Search Report dated Jul. 31, 2006 for PCT/US2006/012660.

International Search Report dated Nov. 3, 2006 for PCT/US2006/011928.

TRANSPARENT POLYMER BLENDS AND ARTICLES PREPARED THEREFROM

CROSS REFERENCES TO RELATED APPLICATIONS

This application claims the benefit of U.S. Non-Provisional application Ser. Nos. 11/363,375, filed Feb. 27, 2006 and 11/363,374, filed Feb. 27, 2006, each of which claim the benefit of U.S. Provisional Application Ser. Nos. 60/657,746, filed Mar. 2, 2005, and 60/657,747, filed Mar. 2, 2005, each of which are incorporated herein by reference in their entirety.

FIELD OF THE INVENTION

This invention pertains to transparent, immiscible polymer blends comprising at least two polymer components. Specifically, this invention relates to immiscible blends comprising at least one thermoplastic polymer and a copolyamide or a homogeneous blend of at least two polyamides in which the different phases of the immiscible blend have small differences in the absolute value of their refractive indices. This invention also pertains to shaped articles comprising the immiscible blends in which the refractive indices of the polymer components are closely matched.

BACKGROUND OF THE INVENTION

Many products, in particular food products, are sensitive to the presence of oxygen and the loss or absorption of water. Packaged products with this sensitivity are susceptible to deterioration because of exposure to oxygen or absorption of moisture. Packaging materials which limit oxygen exposure to food articles, for example, help to maintain the quality of the food articles and to reduce spoilage. The use of such barrier packaging thus keeps the article in inventory longer and thereby reduces restocking costs and waste. Attempts to solve this problem have led to the widespread use of oxygen barriers and/or moisture barriers in packaging materials. Many polymeric materials are known to act as barriers to oxygen or moisture. For example, typical moisture barriers include polyethylene and polypropylene. Representative oxygen barriers include poly(ethylene vinyl alcohol) ("EVOH"), poly(vinyl alcohol) ("PVOH"), polyamides (nylons), and blends of these materials. Poly(vinylidene chloride), vinyl chloride copolymers, and vinylidene chloride-methyl acrylate copolymers also are useful as moisture and oxygen barriers.

These conventional barrier materials, however, are expensive and have unstable structural characteristics or other deficiencies that make fabrication of packaging materials solely out of barrier materials difficult or undesirable. For example, EVOH, while having superior oxygen barrier properties, is not effective as a moisture barrier. Other barrier materials are prohibitively expensive to be used solely as a packaging material. To avoid these problems, it has become a common practice to use multilayer structures in which the amount of expensive barrier material may be reduced to a thin layer and used in conjunction with an inexpensive polymer on one or both sides of the barrier layer as structural layers. The use of multilayer structures also helps to protect the barrier layer from deterioration by structural layers. Multilayer products, however, can be expensive to produce. Further, multilayer articles can present difficulties in recycling because the different polymer components are difficult to separate. In addition, blending the recovered scrap polymer or "regrind" with virgin polymer often will cause unsatisfactory haze or opaqueness because of the incompatibility of the virgin materials with the regrind.

The shortcomings of conventional barrier polymers also may be overcome by using a blend of the barrier polymer with another polymer. Unfortunately, as noted above, many blends of barrier polymers and other thermoplastic polymers are immiscible and are opaque or hazy. Such blends are not satisfactory for applications requiring clarity such as, for example, beverage containers.

Polyester polymers such as, for example, poly(ethylene terephthalate) ("PET"), are commonly used in packaging applications. PET has a number of properties that make it useful as a packaging material, including acceptable carbon dioxide barrier properties for soft drinks packaged in bottles containing multiple servings. However, improvements in the carbon dioxide barrier of PET are needed for soft drinks packaged in smaller bottles and in its oxygen barrier, which is not well-suited for packaging oxygen sensitive products such as, for example, beer, citrus products, tomato-based products, and aseptically packed meat. Poly(ethylene naphthalate) ("PEN") is 3-10 times more effective as a barrier than PET but is more expensive.

Multilayer structures can be used to improve the gas barrier characteristics of PET. For example, polymers that have excellent oxygen barrier (also referred to as "passive barrier") or scavenging properties (also referred to as "active barrier") may be combined with PET to produce a layered structure consisting of the individual polymers. These multilayer structures, however, are expensive to produce. Blends of barrier polymers with PET also have been used to improve the oxygen barrier of packages but, as noted above, often have poor transparency and are not suitable for many packaging applications. The poor transparency of blends also makes it difficult to recycle manufacturing scrap from polymer blends into virgin polymer.

Copolyester films and extrusion blow molded ("EBM") bottles are often desired for toughness, and are commonly used instead of PET for extrusion blow molding and film applications. These applications often require barrier that is comparable to that of oriented PET. Unfortunately, however, the barrier properties of copolyesters are inferior to oriented PET. Multilayer structures can be produced by coextruding a thin, barrier film into the center of a thicker bulk structure to improve the overall barrier. To be economical, however, EBM and film processes typically require that high levels (up to 80%) of regrind (i.e., flash and trim) are reprocessed. Unfortunately, typical barrier materials are not miscible with copolyesters and blends of these barrier polymers with polyesters often show a high level of haze and poor clarity. The haze level of the overall film structure, therefore, is increased to unacceptable levels when scrap polymer (i.e., regrind) is incorporated back into the primary layer.

A polymer blend that provides good passive and/or active barrier properties, is economical, and can be recycled efficiently is needed in the art. Such blends should be transparent, contain thermoplastic and barrier polymers that provide a high barrier for oxygen, water, and carbon dioxide, and can be used economically in article forming processes which incorporate a high level of regrind. In addition, there is need for barrier and thermoplastic polymer compositions that can be used to economically produce multilayered articles having high transparency and can tolerate a high level of regrind.

SUMMARY OF THE INVENTION

Polymer compositions having high transparency and high barrier properties can be prepared from a immiscible blend of one or more thermoplastic polymers and a copolyamide or a homogeneous, transamidized blend of at least 2 polyamides in which the difference in refractive index between the polyamide component and thermoplastic polymer component is about 0.006 to about −0.0006. Thus, the present invention provides a polymer composition, comprising an immiscible blend of:
(i) a first component comprising at least one thermoplastic polymer selected from polyesters, polycarbonates, polyarylates, and homogeneous blends thereof; and
(ii) a second component comprising a homogeneous, transamidized blend of at least 2 polyamides;
wherein the second component (ii) and the first component (i) have a difference in refractive index, RI(second component)−RI(first component), of about 0.006 to about −0.0006, and the immiscible blend has a percent transmittance of at least 75%, and a haze of 10% or less.

The first component comprises at least one thermoplastic polymer selected from polyesters, polycarbonates, polyarylates, and homogeneous blends of these polymers, while the second component comprises a blend of at least 2 polyamides which have been transamidized to produce a homogeneous blend. We have discovered that refractive indices of the first and second components can be closely matched by selecting at least 2 polyamides having different levels of aliphatic and aromatic residues and transamidizing these polyamides to form a homogeneous blend. Thus, homogeneous blends of the thermoplastic polymers and the polymamides can be used to tailor refractive indices of the second component and the first component to within their desired ranges such that the difference in refractive indices is about 0.006 to about −0.0006. For example, a homogeneous blend of a polyester and a polycarbonate comprising the residues of bisphenol A can be used as the first component and a transamidized, homogeneous blend of first polyamide comprising the residues of m-xylylenediamine and adipic acid, and a second aliphatic polyamide can be used as the barrier polymer. When the refractive indices are thus matched, the first and second components form clear, immiscible blends that are suitable for the preparation of high clarity, shaped articles that can be used in many packaging applications. Multilayered articles may also be prepared by a variety of processes known in the art. For example, the first and second components may be coextruded or coinjected from the melt into separate layers, or the layers may be formed individually and brought together in a subsequent process such as, for example, lamination.

The second component can also comprise a copolyamide having a ratio of aromatic and aliphatic dicarboxylic acid and diamine residues that can be varied to closely match the refractive indices of the first and second components. Thus, another aspect of the invention is a polymer composition, comprising an immiscible blend of:
(i) a first component comprising at least one thermoplastic polymer selected from polyesters, polycarbonates, polyarylates, and homogeneous blends thereof; and
(ii) a second component comprising a copolyamide;
wherein the second component (ii) and the first component (i) have a difference in refractive index, RI(second component)−RI(first component), of about 0.006 to about −0.0006, and the immiscible blend has a percent transmittance of at least 75%, and a haze of 10% or less.

Another aspect of our invention is a polymer composition comprising an immiscible blend prepared by a process comprising melt blending:
(i) a first component comprising at least one thermoplastic polymer selected from polyesters, polycarbonates, polyarylates, and homogeneous blends thereof; and
(ii) a second component comprising a homogeneous, transamidized blend of at least 2 polyamides;
wherein the second component (ii) and the first component (i) have a difference in refractive index, RI(second component)−RI(first component), of about 0.006 to about −0.0006, and the immiscible blend has a percent transmittance of at least 75%, and a haze of 10% or less.

The compositions of our invention show excellent barrier properties. The oxygen barrier properties may be enhanced by incorporating transition metal catalysts such as, for example, cobalt, manganese, iron, ruthenium, copper, nickel, palladium, and platinum into the blends to produce oxygen scavenging compositions. The invention, thus, further provides an oxygen-scavenging composition comprising:
(A) an immiscible blend comprising
  (i) first component comprising at least one thermoplastic polymer selected from polyester, polycarbonate, polyarylate, and homogeneous blends thereof;
  (ii) a second component comprising a transamidized, homogeneous blend of at least two polyamides;
    wherein the second component (ii) and the first component (i) have a difference in refractive index, RI(second component)−RI(first component), of about 0.006 to about −0.0006, and the immiscible blend has a percent transmittance of at least 75%, and a haze of 10% or less; and
(B) at least one metal selected from Groups 3-12, Rows 4-6 of the Periodic Table of the Elements. Typical metal catalysts are cobalt, manganese, and iron.

The blends of the present invention are useful for producing clear, shaped articles having improved barrier properties, melt processability, and excellent mechanical properties, and which can be prepared using a high proportion of regrind to virgin polymer. These shaped articles may have a single layer or multiple layers and have numerous packaging applications. Accordingly, the invention further provides a process for forming a shaped article, comprising:
(A) melt blending
  (i) a first component comprising at least one thermoplastic polymer selected from polyesters, polycarbonates, polyarylates, and homogeneous blends thereof; and
  (ii) a second component comprising a copolyamide or a homogeneous, transamidized blend of at least 2 polyamides;
    wherein the first component (i) and second component (ii) form an immiscible blend, the second component and the first component have a difference in refractive index, RI(second component)−RI(first component), of about 0.006 to about −0.0006, and the immiscible blend has a percent transmittance of at least 75%, and a haze of 10% or less;
(B) forming a shaped article;
(C) recovering a scrap polymer composition comprising the blended first and second components (i) and (ii);
(D) grinding the scrap polymer composition to produce a polymer regrind;
(E) optionally, drying the scrap polymer composition; and
(F) combining the polymer regrind with the first and second components (i) and (ii) of step (A). Examples of shaped articles which may be prepared by the process of the invention include, but are not limited to, sheets, films, tubes, bottles, or profiles. The shaped article may be produced by extrusion, calendering, thermoforming, blow-molding, extrusion blow-molding, injection molding, compression molding, casting, drafting, tentering, or blowing.

The shaped articles may have a one or more layers comprising an immiscible blend of the first and second components or can have multiple layers in which the first and second components are in separate layers. The invention also provides a multilayered, shaped article, comprising:
(i) a first layer comprising at least one thermoplastic polymer selected from polyester, polycarbonate, polyarylate, and homogeneous blends thereof; and
(ii) a second layer comprising a transamidized homogeneous blend of at least two polyamides;
wherein the second layer (ii) and the first layer (i) have a difference in refractive index, RI(second layer)−RI(first layer), of about 0.006 to about −0.0006, and the shaped article has a percent transmittance of at least 75%, and a haze of 10% or less.

The invention further provides a process for forming a multilayered shaped article, comprising:
(i) heating a first component comprising at least one thermoplastic polymer selected from polyesters, polycarbonates, polyarylates, and homogeneous blends thereof to a temperature of about Tg+100° C. to about Tg+300° C. of the first component;
(ii) heating a second component comprising a copolyamide or a transamidized, homogeneous blend of at least two polyamides to a temperature of about Tg+100° C. to about Tg+300° C. of the second component;
(iii) forming a shaped article having the first and second components in separate layers;
(iv) recovering scrap first and second components;
(v) grinding the scrap first and second components to produce a regrind;
(vi) optionally, drying the regrind; and
(vii) combining the regrind with the first component, second component, or a combination thereof, of steps (i) and (ii);
wherein the second component of step (ii) and the first component of step (i) of have a difference in refractive index, RI(second component)−RI(first component), of about 0.006 to about −0.0006, and the shaped article has a percent transmittance of at least 75%, and a haze of 10% or less. The regrind may be incorporated into the first or second layer and may be from about 5 to about 60 weight percent of the article.

DETAILED DESCRIPTION

Polymer compositions having high clarity and good barrier properties can be prepared from an immiscible blend of one or more thermoplastic polymers and a transamidized, homogeneous blend of at least two polyamides, in which the difference in refractive index between the blend of polyamides and the thermoplastic polymers is about 0.006 to about −0.0006. The immiscible blend has a percent transmittance of at least 75%, and a haze of 10% or less. In a general embodiment, the present invention provides polymer composition, comprising an immiscible blend of:
(i) a first component comprising at least one thermoplastic polymer selected from polyesters, polycarbonates, polyarylates, and homogeneous blends thereof; and
(ii) a second component comprising a homogeneous, transamidized blend of at least 2 polyamides;
wherein the second component (ii) and the first component (i) have a difference in refractive index, RI(second component)−RI(first component), of about 0.006 to about −0.0006, and the immiscible blend has a percent transmittance of at least 75%, and a haze of 10% or less. The thermoplastic polymers and polyamides may be selected from a wide variety of polymers. The refractive indices of the second component and the first component can be adjusted to give a difference of about 0.006 to about −0.0006 by the selection and ratio of the polyamides of the second component or, alternatively, by blending the thermoplastic polymers of the first component to form a homogeneous blend. Our novel compositions can be used to manufacture shaped articles having one or more layers such as, for example, sheets, films, tubes, bottles, and profiles. The shaped article may be produced by extrusion, calendering, thermoforming, blow-molding, extrusion blow-molding, injection molding, compression molding, casting, drafting, tentering, or blowing. Multilayer articles can be prepared in which the immiscible blend is present in one or more layers or the first and second components are in separate layers. Because of the small difference in the refractive indices of the first and second components, shaped articles prepared from the composition of the invention can incorporate substantial quantities of regrind and retain good transparency. The clarity and barrier properties of these shaped articles produced make them particularly useful for packaging applications.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons," is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the appended claims, the singular forms "a," "an" and "the" include their plural referents unless the context clearly dictates otherwise. For example, reference a "polymer," or a "shaped article," is intended to include the processing or making of a plurality of polymers, or articles. References to a composition containing or including "an" ingredient or "a" polymer is intended to include other ingredients or other polymers, respectively, in addition to the one named.

By "comprising" or "containing" or "including" we mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

The term "polyester," as used herein, is intended to include homopolyesters, copolyesters, and terpolyesters. In general, polyesters are synthetic polymers prepared by the polycondensation of one or more difunctional carboxylic acids with one or more difunctional hydroxyl compounds. Typically, the difunctional carboxylic acid is a dicarboxylic acid or a hydroxycarboxylic acid, and the difunctional hydroxyl compound is a dihydric alcohol such as, for example, glycols and diols. In the present invention, the difunctional carboxylic acid may be an aliphatic or cycloaliphatic dicarboxylic acid such as, for example, adipic acid, or an aromatic dicarboxylic acid such as, for example, terephthalic acid. The difunctional hydroxyl compound may be cycloaliphatic diol such as, for example, 1,4-cyclohexanedimethanol, a linear or branched aliphatic diol such as, for example, 1,4-butanediol, or an aromatic diol such as, for example, hydroquinone.

The term "polyamide," as used herein, is intended to include synthetic polymers prepared by the polycondensation of one or more difunctional carboxylic acids with one or more difunctional amines or by the ring-opening polymerization of a lactam and may include homopolymers and copolymers. For example, the difunctional carboxylic acid can be a dicarboxylic acid such as adipic acid or isophthalic acid, and the difunctional amines can be a diamine such as, for example, hexamethylene diamine or m-xylylenediamine. The term "copolyamide," as used herein, is understood to mean a polyamide comprising at least 2, chemically distinct repeating units. For example, MXD6 nylon, is not a copolyamide because it contains only a single, chemically distinct repeating unit containing the residues of adipic acid and m-xylylenediamine. By contrast, poly(hexamethylene adipamide-co-isophthalamide), prepared by the condensation of hexamethylenediamine with adipic and isophthalic acid, has two chemically distinct repeating units, that is, a repeating unit containing the residues of hexamethylenediamine and adipic acid, and another repeating unit containing the residues of hexamethylene diamine and isophthalic acid.

The term "polycarbonate" is herein defined as the condensation product of a carbonate source and a diol source, having a carbonate component containing 100 mole percent carbonate units and a diol component containing 100 mole percent diol units, for a total of 200 mole percent monomeric units or 100 mole percent "repeating units." In one embodiment of the present invention, the polycarbonate portion of the first component is based upon the polycarbonate of 4,4'-isopropylidenediphenol, commonly known as bisphenol A polycarbonate. A wide variety of the linear or branched polycarbonates that may be utilized in the present invention may be derived from bisphenol A and can be prepared according to procedures well known in the art such as, for example, as disclosed in U.S. Pat. Nos. 3,030,335 and 3,317,466. Examples of bisphenol A polycarbonates that may be used in the present invention and are available commercially include the materials marketed under the tradenames LEXAN®, available from the General Electric Company, and MAKROLON®, available from Bayer, Inc.

The term "polyarylate," as used herein, is understood to mean polyesters prepared by the polycondensation of one or more difunctional aromatic dicarboxylic acids with one or more dihydric phenols. For example, typical aromatic dicarboxylic acids are terephthalic and isophthalic acid, and typical aromatic diphenols are bisphenol A and hydroquinone.

The term "residue," as used herein in reference to the polymers of the invention, means any organic structure incorporated into a polymer through a polycondensation or ring opening reaction involving the corresponding monomer. The term "repeating unit," as used herein, means shortest sequence of monomer residues that can be found repeatedly in a polymer. For example, in polyesters, a repeating unit is an organic structure having dicarboxylic acid residue and a diol residue, or hydroxycarboxylic acid residues bonded through a carbonyloxy group. In a polyamide, a repeating unit is an organic structure having a dicarboxylic acid and a diamine residue, lactam, or aminoacid residues, bonded through a amide group.

It will also be understood by persons having ordinary skill in the art, that the residues associated within the various polyesters, polyamide, polycarbonates, and polyarylates of the invention can be derived from the parent monomer compound itself or any derivative of the parent compound. For example, the dicarboxylic acid and amino acid residues referred to in the polymers of the invention may be derived from a dicarboxylic acid or aminoacid monomer or its associated acid halides, esters, salts, anhydrides, or mixtures thereof. Thus, as used herein, the term "dicarboxylic acid" or "aminoacid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester or polyamide. "Hydroxycarboxylic acid" is intended to include aliphatic and cycloaliphatic hydroxycarboxylic acids as well as monohydroxy-monocarboxylic acids and any derivative thereof, including their associated acid halides, esters, cyclic esters (including dimers such as lactic acid lactides), salts, anhydrides, mixed anhydrides, or mixtures thereof, useful in a polycondensation process or ring opening reaction to make a high molecular weight polyester. Similarly, "aminoacid" is intended to include aliphatic, aromatic, and cycloaliphatic aminoacids and any derivative thereof, including their associated acid halides, amides, cyclic amides (lactams), salts, anhydrides, mixed anhydrides, or mixtures thereof, useful in a polycondensation process or ring opening reaction to make a high molecular weight polyamide. In addition, the term "diamine" is intended to include diamines as well as their associated salts, amides, or any other derivative thereof that are useful for the preparation of polyamides.

Whenever the term "inherent viscosity" (I.V.) is used in this application, it will be understood to refer to viscosity determinations made at 25° C. using 0.5 grams of polymer per 100 ml of a solvent comprising 60 weight percent phenol and 40 weight % tetrachloroethane.

The term "refractive index" (abbreviated herein as "RI") as used herein, refers to refractive index measurements obtained according to standard methods well known in the art. The refractive indices reported herein were determined at a wavelength of 633 nm using a Metricon Prism Coupler™ model 2010 refractometer (available from Metricon Inc.) and are reported as the average of the refractive indices measured in 3 orthogonal directions (extrusion or stretch, transverse, and thickness directions). The phrase "difference in refractive index" as used herein in the context of the compositions, processes, and shaped articles of the invention always means the value obtained by subtracting the refractive index of the polyester, polycarbonate, or polyarylate-containing component (typically referred to herein as the "first component" or "first layer" in multilayered articles) from the refractive index of the polyamide- or copolyamide-containing component (typically referred to herein as the "second component" or "second layer" in multilayered articles). Thus, in accordance with the invention, the difference in refractive index ("ΔRI") should be calculated according to the following formula:

ΔRI=RI(second component or layer)−RI(first component or layer)

It will be evident to persons skilled in the art that the difference in refractive index may be a positive or negative number.

The term "% haze," as used herein, refers to haze values determined according to ASTM Method D1003 using a HunterLab UltraScan Sphere 8000 Colorimeter manufactured by Hunter Associates Laboratory, Inc., Reston, Va. using Hunter's Universal Software (version 3.8) (% Haze=100*Diffuse Transmission/Total Transmission). The procedure for the determination of refractive index is provided in the Examples. For the compositions of the invention, haze and % transmittance are determined by molding or casting the composition into a sheet or film having a thickness of ⅛ inch or less and measuring the haze according to the procedure described in the examples. For shaped articles, including multilayer shaped articles, the haze and % transmittance can be determined by cutting out a small (i.e., 1×1 cm) section of the article, having a thickness of ⅛ inch or less, and measuring the haze according the procedure described herein.

The term glass transition temperature ("Tg") as used herein, refers to the Tg values determined using differential scanning calorimetry ("DSC"), typically using a scan rate of 20° C./min. An example of a DSC instrument is TA Instruments 2920 Differential Scanning calorimeter.

The compositions of the present invention comprise a first component comprising one or more thermoplastic polymers selected from polyesters, polycarbonates, polyarylates, and homogeneous blends thereof. The term "thermoplastic polymer," as used herein, is intended to have its plain meaning as would be understood by persons having ordinary skill in the art, that is, a polymer that softens when exposed to heat and returns to its original condition when cooled to room temperature. The first component may comprise a single thermoplastic polymer or may comprise a blend of 2 or more polymers provided that the blend is a homogeneous blend. The term "homogeneous blend," as used herein, is synonymous with the term "miscible," and is intended to mean that the blend has a single, homogeneous phase as indicated by a single, composition-dependent Tg. For example, a first polymer that is miscible with second polymer may be used to "plasticize" the second polymer as illustrated, for example, in U.S. Pat. No. 6,211,309. Homogeneous blends may be formed by simply blending two or polymers or, in the case of condensation polymers such as for example, polyesters or polyamides, by transesterifying or transamidating two or more polymers. By contrast, the term "immiscible," as used herein, denotes a blend that shows at least 2, randomly mixed, phases and exhibits more than one Tg. Some polymers may be immiscible and yet compatible with each other. A further general description of miscible and immiscible polymer blends and the various analytical techniques for their characterization may be found in *Polymer Blends* Volumes 1 and 2, Edited by D. R. Paul and C. B. Bucknall, 2000, John Wiley & Sons, Inc.

The first component may comprise one or more thermoplastic polymers selected from polyesters, polycarbonates, polyarylates, and homogeneous blends thereof. For example, the first component may comprise a polyester comprising (a) diacid residues, comprising at least 80 mole percent, based on the total diacid residues, of the residues of at least one dicarboxylic acid selected from terephthalic acid, isophthalic acid, naphthalenedicarboxylic acid, and 1,4-cyclohexanedicarboxylic acid, and 0 to about 20 mole percent of the residues of at least one modifying dicarboxylic acid having 2 to 20 carbon atoms; and (b) diol residues comprising at least 80 mole percent, based on the total moles of diol residues, of the residues of at least one diol selected from ethylene glycol, 1,4-cyclohexanedimethanol; neopentyl glycol, diethylene glycol, 1,3-propanediol, 1,4-butanediol, and, 2,2,4,4-tetramethyl-1,3-cyclobutanediol; and from 0 to about 20 mole percent of the residues of at least one modifying diol having from 3 to 16 carbons. Cyclic diols containing cis and trans isomers may be used as the pure cis or trans isomer or as a mixture of cis and trans isomers.

For example, the diacid residues can comprise the residues of one or more dicarboxylic acids selected from terephthalic acid, isophthalic acid, or combinations thereof, and the diol residues comprise the residues of one or more diols selected from 1,4-cyclohexanedimethanol, neopentyl glycol, ethylene glycol, and combinations thereof. In one embodiment, for example, the diacid residues may comprise the residues of terephthalic acid and isophthalic acid. A higher concentration of terephthalic acid in the polyester than isophthalic acid is advantageous because the resulting polyester provides greater impact strength to the blend. For example, the diacid residues may comprise from about 60 to about 100 mole percent of the residues terephthalic acid and 0 to about 40 mole percent of the residues isophthalic acid and the diol residues may comprise about 100 mole percent of the residues of 1,4-cyclohexanedimethanol. Other examples of dicarboxylic acid content include about 80 to about 100 mole percent terephthalic acid and 0 to 20 mole percent isophthalic acid, and about 100 mole percent terephthalic acid.

Other representative polyesters that may be used as the thermoplastic polymers of component (i) include polyesters comprising: (a) diacid residues comprising 80 to 100 mole percent of the residues of terephthalic acid and diol residues comprising about 50 to about 90 mole percent of the residues of 1,4-cyclohexanedimethanol and about 10 to about 50 mole percent of the residues of neopentyl glycol; (b) diacid residues comprising 100 mole percent of the residues of terephthalic acid and diol residues comprising about 10 to about 40 mole percent of the residues of 1,4-cyclohexanedimethanol and 60 to about 90 mole percent of the residues of ethylene glycol; (c) diacid residues comprising 100 mole percent terephthalic acid and diol residues comprising about 10 to about 99 mole percent of the residues of 1,4-cyclohexanedimethanol, 0 to about 90 mole percent of the residues of ethylene glycol, and about 1 to about 25 mole percent of the residues of diethylene glycol; and (d) diacid residues comprising 100 mole percent terephthalic acid and diol residues comprising about 50 to about 90 mole percent 1,4-cyclohexanedimethanol and about 10 to about 50 mole percent ethylene glycol.

In yet another example, the dicarboxylic acid may be selected from terephthalic acid and isophthalic acid, and the diol is selected from 1,4-cyclohexanedimethanol and ethylene glycol. In one composition, for example, the dicarboxylic acid is terephthalic acid and the diol is 1,4-cyclohexanedimethanol. In yet another example, the diacid residues may comprise at least 95 mole percent of the residues of terephthalic acid and the diol residues may comprise about 10 to about 40 mole percent of the residues of 1,4-cyclohexanedimethanol, about 1 to about 25 mole percent of the residues of diethylene glycol, and about 35 to about 89 mole percent of the residues of ethylene glycol.

The polyester may further comprise 0 to about 20 mole percent of one or more residues of a modifying diacid containing 2 to 20 carbon atoms if desired. For example, from 0 to about 30 mole % of other aromatic dicarboxylic acids containing 8 to about 16 carbon atoms, cycloaliphatic dicarboxylic acids containing 8 to about 16 carbon atoms, aliphatic dicarboxylic acids containing about 2 to about 16 carbon atoms, or mixtures thereof may be used. Examples of modifying carboxylic acids include, but are not limited to, one or more of 4,4'-biphenyldicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-oxybenzoic acid, trans-4,4'-stilbenedicarboxylic acid, oxalic acid, malonic acid, succinic acid, glutaric acid, adipic acid, pimelic acid, suberic acid, azelaic acid, and sebacic acid.

In another embodiment, the polyester can comprise about 1 to about 99 mole percent, based on the total moles of diol residues, of the residues of 1,4-cyclohexanedimethanol, about 99 to about 1 mole percent of the residues ethylene glycol. Typical mole percentages for the residues of 1,4-cyclohexanedimethanol for the polyesters of the invention include from about 1 to about 10 mole percent, from about 1 to about 25 mole percent, from about 1 to about 40 mole percent, 50 mole percent and greater, and 100 mole percent. In another embodiment, for example, the dicarboxylic acid is 1,4-cyclohexanedicarboxylic acid and the diol is 1,4-cyclohexanedimethanol. In a further example, the polyester may comprise the residues of 1,4-cyclohexanedimethanol units and the neopentyl glycol. In yet another example, the polyester may comprise the residues of 1,4-cyclohexanedimethanol units and 2,2,4,4-tetramethyl-1,3-cyclobutanediol.

The diol component of the polyester also may be modified from 0 to about 20 mole percent of the residues of at least one modifying diol having from 3 to 16 carbons. Other ranges of modifying diol include, but are not limited to, from 0 to about 10 mole percent, and less than 5 mole percent. The modifying diol may be selected from one or more of 1,2-propanediol, 1,3-propanediol, 1,4-butanediol, 1,5-pentanediol, 1,6-hexanediol, 1,4-cyclohexanedimethanol, p-xylene glycol, neopentyl glycol, polyethylene glycol, polytetramethylene glycol, and 2,2,4,4-tetramethyl-1,3-cyclobutanediol. Examples of polyalkylene glycols include poly(tetramethylene glycol) ("PTMG") and poly(ethylene glycol) ("PEG") having molecular weights up to about 2,000. The diol component, for example, can be modified with 0 to about 10 mole percent polyethylene glycol or polytetramethylene glycol to enhance elastomeric behavior. In another example, the diol residues may comprise about 10 to about 99 mole percent of residues of 1,4-cyclohexanedimethanol, 0 to about 90 mole percent of residues of ethylene glycol, and about 1 to about 25 mole percent of residues of diethylene glycol. The polyester also may contain up to about 5 mole percent, typically from about 0.1 to about 2.0 mole %, based on the acid or diol component, of the residues of a polyfunctional branching agent derived from a compound having at least three carboxyl and/or hydroxy groups to form a branched polyester. Examples of such compounds include trimellitic acid or anhydride, trimesic acid, pyromellitc anhydride, trimethylolethane, trimethylolpropane, a trimer acid, and the like. It will be understood by persons skilled in the art that the final composition can be arrived at by blending various resins or by direct reactor copolymerization. The latter is desirable to minimize compositional variability but economic necessities often make blending more cost effective.

Additional examples of polyesters are those containing 100 mole percent terephthalic residues, based on the total diacid residues, and any one of the following diol residue compositions, based on the total diol residues: (i) about 1 to about 5 mole percent of the residues of 1,4-cyclohexanedimethanol and about 99 to about 95 mole percent of the residues of ethylene glycol; (ii) about 29 to about 33 mole percent of the residues of 1,4-cyclohexanedimethanol and about 71 to about 67 mole percent of the residues of ethylene glycol; (iii) about 45 to about 55 mole percent of the residues of 1,4-cyclohexanedimethanol and about 55 to about 45 mole percent of the residues of ethylene glycol; (iv) about 60 to about 65 mole percent of the residues of 1,4-cyclohexanedimethanol and about 40 to about 35 mole percent of the residues of ethylene glycol; (v) about 79 to about 83 mole percent of the residues of 1,4-cyclohexanedimethanol and about 21 to about 17 mole percent of the residues of ethylene glycol; and (vi) about 100 mole percent of the residues of 1,4-cyclohexanedimethanol.

The polyesters generally will have inherent viscosity (I.V.) values in the range of about 0.4 dL/g to about 1.4 dL/g. Additional examples of I.V. ranges include about 0.65 dL/g to about 1.0 dL/g and about 0.7 dL/g to about 0.85 dL/g. As described previously, inherent viscosity is measured at 25° C. using 0.5 grams of polymer per 100 ml of a solvent comprising 60 weight percent phenol and 40 weight % tetrachloroethane The polymers of the invention may be crystalline, semicrystalline, or amorphous polymers. The term "semicrystalline," as used herein, means that the polymer contains two phases: an ordered crystalline phase and an unordered amorphous phase. Polymers with a semicrystalline morphology exhibit both a crystalline melting temperature (Tm) and a glass transition temperature (Tg) and may be distinguished from "amorphous" polymers, which exhibit only a glass transition temperature.

The polyesters used in the present invention typically are prepared from dicarboxylic acids and diols which react in substantially equal proportions and are incorporated into the polyester polymer as their corresponding residues. The polyesters derived from dicarboxylic acid and diol residues of the present invention, therefore, contain substantially equal molar proportions of acid residues (100 mole percent) and diol residues (100 mole percent) such that the total moles of repeating units is equal to 100 mole percent. The mole percentages provided in the present disclosure, therefore, may be based on the total moles of acid residues, the total moles of diol residues, or the total moles of repeating units. For example, a copolyester containing 30 mole percent terephthalic acid, based on the total acid residues, means that the copolyester contains 30 mole percent terephthalic residues out of a total of 100 mole percent acid residues. Thus, there are 30 moles of terephthalic residues among every 100 moles of acid residues. In another example, a copolyester containing 30 mole percent 1,4-cyclohexanedimethanol, based on the total diol residues, means that the copolyester contains 30 mole percent 1,4-cyclohexanedimethanol residues out of a total of 100 mole percent diol residues. Thus, there are 30 moles of 1,4-cyclohexanedimethanol residues among every 100 moles of diol residues. As used herein, copolyesters of terephthalic acid, ethylene glycol, and 1,4-cyclohexanedimethanol may be referred to as "PET" when the glycol component is primarily ethylene glycol, "PCT" when the glycol component is primarily 1,4-cyclohexanedimethanol, "PETG" when the ratio of ethylene glycol to 1,4-cyclohexanedimethanol is greater than 1 and "PCTG" when the ratio of ethylene glycol to 1,4-cyclohexanedimethanol ratio is less than 1.

The polyesters of the instant invention are readily prepared from the appropriate dicarboxylic acids, esters, anhydrides, or salts, and the appropriate diol or diol mixtures using typical polycondensation reaction conditions. Thus, the dicarboxylic acid component of the polyesters of the present invention can be derived from dicarboxylic acids, their corresponding esters, or mixtures thereof. Examples of esters of the dicarboxylic acids useful in the present invention include the dimethyl, dipropyl, diisopropyl, dibutyl, and diphenyl esters, and the like.

The polyesters of the present invention are prepared by procedures known to persons skilled in the art. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The reaction of the diol and dicarboxylic acid may be carried out using conventional polyester polymerization conditions or by melt phase processes, but those with sufficient crystallinity may be made by melt phase followed by solid phase polycondensation techniques. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The thermoplastic polymers of the invention may also comprise a polyarylate. Polyarylates are obtained by polymerization of a dihydric phenol and a dicarboxylic acid. Examples of polyarylates that can be used in the compositions, processes, and shaped articles of the instant invention are described in U.S. Pat. Nos. 4,598,130; 5,034,502; and 4,374,239. Examples of dihydric phenols that can be used to prepare the polyarylates are bisphenols such as bis(4-hydroxyphenyl)methane; 2,2-bis(4-hydroxyphenyl) propane ("bisphenol-A"); 2,2-bis(4-hydroxy-3-methylphenyl)propane; 4,4-bis(4-hydroxyphenyl)heptane; 2,2-bis(4-hydroxy-3,5-dichlorophenyl)propane; 2,2-bis(4-hydroxy-3,5-dibromophenyl)propane; dihydric phenol ethers such as, for example, bis(4-hydroxyphenyl)ether; bis(3,5-dichloro-4-hydroxyphenyl)ether; dihydroxydiphenyls such as, for example, p,p'-dihydroxydiphenyl, 3,3'-dichloro-4,4'-dihydroxydiphenyl; dihydroxyaryl sulfones such as, for example, bis(4-hydroxyphenyl)sulfone; bis(3,5-dimethyl-4-hydroxyphenyl)sulfone; dihydroxy benzenes such as, for example, resorcinol; hydroquinone; halo- and alkyl-substituted dihydroxy benzenes such as, for example, 1,4-dihydroxy-2,5-dichlorobenzene; 1,4-dihydroxy-3-methylbenzene; and dihydroxy diphenyl sulfoxides such as, for example, bis(4-hydroxyphenyl)sulfoxide; and bis(3,5-dibromo-4-hydroxyphenyl) sulfoxide. A variety of additional dihydric phenols are also available such as are disclosed, for example, in U.S. Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl)propane and 2,2-bis(3,5-dibromo-4-hydroxyphenyl)propane. It is also possible to employ two or more different dihydric phenols or a copolymer of a dihydric phenol with a glycol, with hydroxy or acid terminated polyester, or with a dibasic acid as well as blends of any of the above materials. Suitable dicarboxylic acids include, but are not limited to, aromatic dicarboxylic acids such as phthalic, isophthalic, terephthalic, o-phthalic, o-, m-, and p-phenylenediacetic acids, and polynuclear aromatic acids such as, for example, diphenic acid and 1,4-naphthalic acid.

Additional examples of polyarylates that can be used in the present invention include those polymers resulting from the polymerization of bisphenol A (2,2-bis-(4-hydroxyphenyl) propane) and a 50:50 mixture iso/terephthalic acids. Some of the polymers are commercially available under the trademark "U-Polymer U-100" (available from Unitika America Corporation). Other examples are polyarylates based on tetramethyl bisphenol-A; 4,4'-dihydroxy-benzophenone; and 5-tertiary-butyl isophthalic acid dichloride.

The polyarylates of the present invention can be prepared by any polyester forming reactions well known in the art such as, for example, interfacial polymerization by mixing a solution of an aromatic dicarboxylic acid dihalide in an organic solvent with an alkaline aqueous solution of a bisphenol under stirring to react these materials; solution polymerization by reacting an aromatic dicarboxylic acid dihalide with a bisphenol in the presence of a deacidifying agent such as pyridine in an organic solvent; molten polymerization by reacting an aromatic dicarboxylic acid diphenyl ester with a bisphenol; molten polymerization by reacting an aromatic dicarboxylic acid, diphenyl carbonate and a bisphenol; molten polymerization by reacting an aromatic dicarboxylic acid with a bisphenol diacetate; and polymerization by reacting an aromatic dicarboxylic acid with a bisphenol diacetate. Examples of methods for preparation of polyarylates are disclosed in U.S. Pat. Nos. 5,034,502, 4,321,355, and 4,374,239. The polyarylates of the invention typically have inherent viscosities of about 0.5 to about 1.1 dL/gm.

In addition, the polyester, polycarbonates, and polyarylates may further comprise one or more of the following: antioxidants, melt strength enhancers, branching agents (e.g., glycerol, trimellitic acid and anhydride), chain extenders, flame retardants, fillers, acid scavengers, dyes, colorants, pigments, antiblocking agents, flow enhancers, impact modifiers, antistatic agents, processing aids, mold release additives, plasticizers, slips, stabilizers, waxes, UV absorbers, optical brighteners, lubricants, pinning additives, foaming agents, antistats, nucleators, and the like. Colorants, sometimes referred to as toners, may be added to impart a desired neutral hue and/or brightness to the polyester. Preferably, the polyester compositions may comprise 0 to about 30 weight percent of one or more processing aids to alter the surface properties of the composition and/or to enhance flow. Representative examples of processing aids include calcium carbonate, talc, clay, mica, zeolites, wollastonite, kaolin, diatomaceous earth, $TiO_2$, NH4Cl, silica, calcium oxide, sodium sulfate, and calcium phosphate. Use of titanium dioxide and other pigments or dyes, might be included, for example, to control whiteness of the film, or to make a colored articles. An antistat or other coating may also be applied to the surface of the article.

The second component (ii) of the compositions of the invention comprises a transamidized, homogeneous blend of at least two polyamides. Typically, the homogeneous blend will comprise from 2 to about 10 different polyamides. In another example, the homogeneous blend can comprise from 2 to 4 polyamides. In accordance with the present invention, polyamides that display a melting point below about 300° C. can be used as at least one polyamide. In another example, polyamides with the melting point less than about 275° C. and glass transition temperature greater than about 25° C. may be used. Typically, the polyamides have an I.V. between about 0.3 dL/g and about 2.0 dL/g and, preferably at least 0.5 dL/g.

For the composition of the invention, it is advantageous that transamidation occur between the polyamides to produce of homogeneous blend. The term "transamidized," as used herein, is intended to be synonymous with the terms "transamidate" and "transamidation," and means the process of exchanging amido groups between two different polyamides. Transamidation between two or more polyamides can be accomplished by contacting the polyamides at elevated temperatures, typically from about 270° C. to about 350° C. Other examples of transamidation temperatures are about 280° C. to about 350° C. and about 290° C. to about 340° C. Transamidation between the polyamides is indicated by the presence of a single glass transition temperature ("Tg") for the blend as determined by differential scanning calorimetry ("DSC") using standard techniques well known to persons skilled in the art such as, for example, described in ASTM Method D3418. The polyamides may be heated together directly at these temperature or in the presence of the thermoplastic polymers of the first component (i). For example, the contacting and, hence, transamidation of the polyamides can take place by melt blending of the first and second components, during extrusion, or other high temperature processing of the polymer composition and its components. In another example, the polyamides may be heated together in a separate vessel and then melt blended with the first component.

The first and second polyamides of the second component may be selected from a wide range of polyamides. To better match the refractive index of the first component, it is desirable, but not essential, that at least one of the polyamides comprise aromatic residues. In one example, the polyamides can comprise partially aromatic polyamides and aliphatic polyamides having a number average molecular weight of 7,000 or less. Combinations of such polyamides are included also within the scope of the invention. Partially aromatic polyamides comprise amide linkages between at least one aromatic ring and at least one nonaromatic species. Although wholly aromatic polyamides generally are liquid crystalline, the blends of such resins having melting points less than 300° C. can be used for this invention. When homogeneous blends of polyamides are used, the rapid transamidization (amide-amide interchange) of aliphatic nylon with aromatic or partially aromatic polyamide permits the tailoring of refractive index of the polyamide blend by adjusting the ratios of aliphatic polyamide to aromatic, or partially aromatic, polyamide. This technique enables a matching of the refractive index of the homogeneous polyamide blend to the thermoplastic polymer such as, for example, one or more polyesters, of the first component. A reference for transamidization can be found in the work by Y. Takeda, et. al., *Polymer*, 1992 vol. 33, pg. 3394.

In accordance with the invention, the second component can be a transamidized, homogeneous blend of 2 or more polyamides such as, for example, a first polyamide and a second polyamide which are selected to give a refractive index in the second component such that second and first components have a difference in refractive index (RI(second component)–RI(first component)) of about 0.006 to about –0.0006. To match the refractive index of the first component, it is advantageous that the first and second polyamide have different amounts of aromatic and aliphatic residues. For example, the second component (ii) can comprise a homogeneous blend of a first polyamide, comprising aromatic residues, and of a second polyamide comprising aliphatic residues. The term "aliphatic," as used herein with respect to the diamine and dicarboxylic acid monomers of the polyamides of the present invention, means that carboxyl or amino groups of the monomer are not connected through an aromatic nucleus. For example, adipic acid contains no aromatic nucleus in its backbone, i.e., the chain of carbon atoms connecting the carboxylic acid groups; thus, it is "aliphatic." By contrast, the term "aromatic" means the dicarboxylic acid or diamine contains an aromatic nucleus in the backbone such as, for example, terephthalic acid or 1,4-metaxylylenediamine. Representative examples of aromatic polyamides are those polyamides comprising at least 70 mole % of residues comprising diamines such as m-xylylenediamine or a xylylenediamine mixture comprising m-xylylenediamine and up to 30% of p-xylylenediamine and an aliphatic dicarboxylic acid having 6 to 10 carbon atoms. The term "aliphatic," therefore, is intended to include both aliphatic and cycloaliphatic structures such as, for example, diamine, diacids, lactams, aminoalcohols, and aminocarboxylic acids, that contain as a backbone a straight or branched chain or cyclic arrangement of the constituent carbon atoms which may be saturated or paraffinic in nature, unsaturated (i.e., containing non-aromatic carbon-carbon double bonds), or acetylenic (i.e., containing carbon-carbon triple bonds). Thus, in the context of the description and the claims of the present invention, aliphatic is intended to include linear and branched, chain structures (referred to herein as "aliphatic") and cyclic structures (referred to herein as "alicyclic" or "cycloaliphatic"). The term "aliphatic," however, is not intended to exclude any aromatic substituents that may be attached to the backbone of an aliphatic or cycloaliphatic diol or diacid or hydroxycarboxylic acid.

The weight percentage ratio of the first and second polyamides present in the transamidized, homogeneous blend may range from about 1:50 to about 50:1 based on the total weight of the second component. Other examples of weight percentage ratios are 1:20 to about 20:1 and about 1:10 to about 10:1.

Examples of polyamides that may be used in the homogeneous blends of the present invention include polyamides comprising one or more of residues selected from isophthalic acid, terephthalic acid, cyclohexanedicarboxylic acid, meta-xylylenediamine (also referred to herein as "m-xylylenediamine"), para-xylylenediamine (also referred to herein as "p-xylylenediamine"), 1,3-cyclohexane(bis)methylamine, 1,4-cyclohexane(bis)-methylamine, aliphatic diacids with 6 to 12 carbon atoms, aliphatic amino acids or lactams with 6 to 12 carbon atoms, aliphatic diamines with 4 to 12 carbon atoms. Other generally known polyamide forming diacids and diamines can be used. The polyamides also may contain small amounts of trifunctional or tetrafunctional comonomers such as trimellitic anhydride, pyromellitic dianhydride, or other polyamide forming polyacids and polyamines known in the art.

Examples of partially aromatic polyamides include, but are not limited to: poly(m-xylene adipamide) (referred to herein as "MXD6" nylon), poly(hexamethylene isophthalamide), poly(hexamethylene adipamide-co-isophthalamide), poly(hexamethylene adipamide-co-terephthalamide), and poly(hexamethylene isophthalamide-co-terephthalamide). In one embodiment, the partially aromatic polyamide is poly(m-xylylene adipamide). In one embodiment, the partially aromatic polyamides may have a number average molecular weight of 7000 or less. Representative examples of aliphatic polyamides include poly(2-pyrrolidinone) (nylon 4, 6; CAS No. 44,299-2); polycapramide (nylon 6; CAS No. 18,111-0), poly(2-piperidone) (nylon 5, CAS No. 24938-57-6); poly(7-aminoheptanoic acid) (nylon 7; CAS No. 25035-01-2); poly(nonanamide) (nylon 9; CAS No. 25748-72-5); poly(11-aminoundecanoic acid) (nylon 11; CAS No. 25035-04-5); poly(12-aminol auric acid) (nylon 12, CAS No. 24937-16-4); poly(ethyleneadipamide) (nylon 2,6); polytetramethyleneadipamide (nylon 4,6; CAS No. 50327-22-5); polyhexamethylene-adipamide (nylon 6,6; CAS No. 42, 917-1), (nylon 6,9; CAS No. 18, 806-9) poly-(hexamethylene-sebacamide) (nylon 6,10; CAS No. 9008-66-6), poly(hexamethylene-undecanamide) (nylon 6, 11) poly(hexamethylene-dodecamide) (nylon 6,12; CAS No. 24936-74-1), poly(octamethylene-adipamide) (nylon 8,6); adipic acid-decamethylenediamine copolymer (nylon 10,6; CAS No. 26123-27-3); polydecamethylene-dodecamide (nylon 10, 12); poly(dodecamethylene-adipamide) (nylon 12,6); and poly(dodecamethylene-sebacamide) (nylon 12,8).

For example, the second component (ii) can comprise a homogeneous blend comprising a first polyamide comprising the residues of m-xylylenediamine and adipic acid, and a second polyamide comprising the residues of at least one aliphatic or cycloaliphatic monomer selected from adipic acid, pimelic acid, suberic acid, azelaic acid, sebacic acid, undecanedioc acid, dodecanedioc acid, caprolactam, butyrolactam, 11-aminoundecanedioc acid, isophthalic acid, and hexamethylene diamine. The first polyamide, for example, can comprise MXD6 nylon, which is commercially available from Mitsubishi Corporation. In another example, the second polyamide can comprise at least one polyamide selected from nylon 4; nylon 6; nylon 9; nylon 11; nylon 12; nylon 6,6; nylon 5,10; nylon 6,12; nylon 6,11; nylon 10,12; and combinations thereof. In yet another example, the second polyamide can comprise nylon 6, nylon 6,6, or blends thereof.

The second component also may comprise a single copolyamide in which the composition of monomer residues is chosen to give a refractive index that closely matches the refractive index of the first component. Thus, in another embodiment, the invention provides a polymer composition, comprising an immiscible blend of:
(i) a first component comprising at least one thermoplastic polymer selected from polyesters, polycarbonates, polyarylates, and homogeneous blends thereof; and
(ii) a second component comprising a copolyamide;
wherein the second component (ii) and the first component (i) have a difference in refractive index, RI(second component)−RI(first component), of about 0.006 to about −0.0006, and the immiscible blend has a percent transmittance of at least 75%, and a haze of 10% or less. For example, the copolyamide can the residues of m-xylylenediamine, p-xylylenediamine, or a combination thereof; and the residues of at least one monomer selected from terephthalic acid, isophthalic acid, adipic acid, pimelic acid, suberic acid, azelaic acid, sebacic acid, undecanedioc acid, dodecanedioc acid, caprolactam, butyrolactam, 11-amino-undecanedioc acid, and 1,6-hexamethylenediamine. In another example, the copolyamide can comprise about 15 to about 100 mole percent of the residues of m-xylylenediamine, based on a total diamine residue content of 100 mole %, and about 15 to about 85 mole percent of the residues adipic acid and about 85 to about 15 mole percent of the residues of one or more aliphatic or cycloaliphatic dicarboxylic acids selected from pimelic acid, suberic acid, azelaic acid, sebacic acid, undecandioic acid, dodecandioic acid, and 1,4-cyclohexanedicarboxylic acid, based on a total diacid residue content of 100 mole %. It is understood that the various embodiments of homogeneous blends of polyamides and copolyamides referred to herein can be combined with any of the embodiments of the polyesters discussed hereinabove.

Other examples of copolyamides that can be used as in composition of the invention, either alone or as part of a homogeneous blend with another polyamide, include, but are not limited to, copolyamides comprising from about 15 to about 100 mole percent of the residues of m-xylylenediamine, based on a total diamine residue content of 100 mole %, and the residues of adipic acid. Typical amounts of adipic acid residues which may be present in these copolyamides, based on the total moles of diacid residues, are about 5 to about 85 mole percent, about 20 to about 80 mole percent, and about 25 to about 75 mole percent. The remainder of the dicarboxylic acid residues can comprise residues from one or more aliphatic dicarboxylic acids having from 7-12 carbon atoms, such as pimelic acid, suberic acid, azelaic acid, sebacic acid, undecanedioic acid, dodecanedioic acid, or 1,4-cyclohexanedicarboxylic acid. In another example, the polyamide acid also may comprise residues from isophthalic acid and terephthalic acid.

The copolyamides of the invention also may comprise other diamines or lactam residues in addition to m-xylylenediamine residues. For example, the copolyamide can comprise at least 15 mole percent, or at least about 20 mole percent of the residues of m-xylylenediamine with the remainder of the diamines residues comprising the residues of one or more aliphatic or aromatic diamines. For example, the copolyamide may comprise about 80 mole percent or about 85 mole %, of the residues of 1,6-hexamethylene diamine, based on the total moles of diamine residues. Varying amounts of p-xylylenediamine, 1,3-cyclohexanebis(methylamine), or 1,4-cyclohexanebis(methylamine), also may be used. Similarly, the copolyamide may comprise the residues of a lactam, such as caprolactam, or lactams based on gamma-amino-butyric acid or 11-amino-undecanoic acid, in an amount from about 10 mole percent to about 90 mole percent, or from about 10 mole percent to about 70 mole percent based on the total moles of repeating units. In another embodiment, the copolyamides of the invention can comprise from about 15 mole percent to about 85 mole percent, about 20 to about 80 mole percent, or about 25 to about 75 mole percent of the residues from m-xylylenediamine, based on the total moles of diamine residues with the remainder of the diamine residues content comprising residues from one or more diamines, such as aliphatic diamines, and especially 1,6-hexamethylene diamine. In this embodiment, the diamine residues may further comprise minor amounts of the residues of other diamines, for example p-xylylenediamine, or a cyclic aliphatic diamine such as, for example, one or more of: 1,3-cyclohexanebis(methylamine) or 1,4-cyclohexanebis(methylamine). Further, the polyamide may optionally include, in place of a portion of the adipic acid, residues from one or more aliphatic or aromatic dicarboxylic acids having from 7-12 carbon atoms, such as pimelic acid, suberic acid, azelaic acid, sebacic acid, undecandioic acid, dodecandioic acid, 1,4-cyclohexanedicarboxylic acid, or isophthalic acid, which may be present in an amount from about 15 mole percent to about 85 mole percent, optionally with minor amounts of terephthalic acid. The polyamide also may comprise the residues of a lactam, such as caprolactam, or lactams based on gamma-amino-butyric acid or 11-amino-undecanoic acid, in an amount from about 10 mole percent to about 90 mole percent, or about 10 mole % to 70 mole percent, based on the total moles repeating units.

In yet another embodiment, the copolyamides according to the invention may comprise from about 15 mole percent up to about 90 mole percent of residues from adipic acid, with the remaining diacid residues comprising the about 10 to about 85 mole percent of the residues of isophthalic acid, based on the total moles of dicarboxylic acid residues. Additional examples of adipic acid and isophthalic acid residue content include about 20 to 80 mole percent, and about 25 to about 75 mole percent. In this embodiment, the polyamide may optionally comprise minor amounts of residues from one or more aliphatic dicarboxylic acids having from 7-12 carbon atoms, such as pimelic acid, suberic acid, azelaic acid, sebacic acid, undecandioic acid, dodecandioic acid, or 1,4-cyclohexanedicarboxylic acid, optionally with minor amounts of terephthalic acid. Optionally, the polyamides may comprise m-xylylenediamine residues. Examples of m-xylylenediamine residue concentrations include about 15 to about 90 mole percent, about 20 to about 85 mole percent, or about 25 to about 80 mole percent. The remaining residues can comprise from one or more aliphatic diamines, such as, for example, 1,6-hexamethylene diamine, one or more aromatic diamines such as, for example, p-xylylenediamine. Similarly, the copolyamide also may comprise the residues of a lactam such as, for example, caprolactam, or lactams based on gamma-amino-butyric acid or 11-amino-undecanoic acid, in an amount from about 10 mole percent to about 90 mole percent or about 10 mole percent to about 70 mole percent, based on the total moles of repeating units.

In yet another example, the copolyamides of the invention may comprise the residues of one or more lactams such as, for example, caprolactam, or lactams based on gamma-amino-butyric acid or 11-amino-undecanoic acid, in an amount from about 10 mole percent to about 90 mole percent, or from about 10 mole percent to about 70 mole percent, or from about 15 mole percent to about 60 mole percent, based on the total moles of repeating units. The residues of one or more aliphatic dicarboxylic acids having from 7-12 carbon atoms, such as pimelic acid, suberic acid, azelaic acid, sebacic acid, undecandioic acid, dodecandioic acid, or 1,4-cyclohexanedicarboxylic acid, also may be present in amounts from about 20 mole percent to about 80 mole percent, based on the total moles of repeating units. For example, the copolyamide may comprise residues from isophthalic acid or terephthalic acid. In this embodiment, the copolyamides can comprise from about 15 mole percent to about 85 mole percent of the residues from m-xylylenediamine, based on the total moles of diamine residues. Other examples of m-xylylenediamine content are about 20 to about 80 mole percent and about 25 to about 75 mole percent. The remainder of the diamine residues may comprise the residues of one or more diamines aliphatic diamines such as, for example, 1,6-hexamethylene diamine. In this embodiment, the diamine residues may further comprise minor amounts of the residues of other diamines, for example p-xylylenediamine, or a cyclic aliphatic diamine such as, for example, one or more of: 1,3-cyclohexanebis (methylamine) or 1,4-cyclohexanebis(methylamine). Optionally, minor amounts of one or more of: p-xylylenediamine, 1,3-cyclohexanebis(methylamine), or 1,4-cyclohexane-bis(methylamine), may be used.

Another embodiment of the invention is polymer composition, consisting essentially of an immiscible blend of:
(i) a first component consisting essentially of at least one thermoplastic polymer selected from polyesters, polycarbonates, polyarylates, and homogeneous blends thereof; and
(ii) a second component consisting essentially of a homogeneous, transamidized blend of at least 2 polyamides;
wherein the second component (ii) and the first component (i) have a difference in refractive index, RI(second component)–RI(first component), of about 0.006 to about –0.0006, and the immiscible blend has a percent transmittance of at least 75%, and a haze of 10% or less. The phrase "consisting essentially of," as used herein is intended to encompass compositions which are immiscible blends, that is, having at least 2, composition-dependent Tg's as measured by DSC, and which have first component containing a polyester, polycarbonate, polyarylate, or homogeneous blends thereof and a second component containing a homogeneous, transamidized blend of at least 2 polyamides. In this embodiment, the composition is understood to exclude any elements that would substantially alter the essential properties of the composition to which the phrase refers. For example, compositions may include other components that do not alter the refractive index of the components, % haze of the blend, the % transmittance, or the miscibility of the blend. For example, the addition of a compatibilizer, which may alter the miscibility and refractive index of the composition, would be excluded from this embodiment. Similarly, a second component containing a copolyamide prepared by copolymerization of the component monomers would be excluded because such a copolyamide would be considered to have different properties than a homogeneous, transamidized blend of at least 2 polyamides, even if the mole percentage of the monomer residues are equivalent.

Similarly, another embodiment of the instant invention is an oxygen-scavenging composition consisting essentially of:
(A) an immiscible blend consisting essentially of
(i) first component consisting essentially of at least one thermoplastic polymer selected from polyester, polycarbonate, polyarylate, and homogeneous blends thereof;

(ii) a second component consisting essentially of a copolyamide or a transamidized, homogeneous blend of at least two polyamides;

wherein the second component (ii) and the first component (i) have a difference in refractive index, RI(second component)–RI(first component), of about 0.006 to about –0.0006, and the immiscible blend has a percent transmittance of at least 75%, and a haze of 10% or less; and (B) at least one metal selected from Groups 3-12, Rows 4-6 of the Periodic Table of the Elements.

In this embodiment, the composition is understood to exclude any elements that would substantially alter the essential properties of the composition to which the phrase refers, such as, for example, the refractive index of the components, % haze of the blend, the % transmittance, the miscibility of the blend, or the oxygen-scavenging proportions of the composition. For example, the addition an oxygen-scavenging component other than a copolyamide or a transamidized blend of polyamides such as, for example, a diene, polyether, or any easily oxidizable organic compound other than the components as listed in the claims would be excluded.

The polyamides used in the present invention typically are prepared from dicarboxylic acids and diamines, which react in substantially equal proportions, or by the ring-opening polymerization of lactams, and are incorporated into the polyamide polymer as their corresponding residues. The polyamides derived from dicarboxylic acid and diamine residues of the present invention, therefore, contain substantially equal molar proportions of acid residues (100 mole percent) and diamine residues (100 mole percent) such that the total moles of repeating units is equal to 100 mole percent. The mole percentages provided in the present disclosure, therefore, may be based on the total moles of acid residues, the total moles of diamine residues, or the total moles of repeating units. For example, a polyamide or copolyamide containing 30 mole percent terephthalic acid, based on the total acid residues, means that the copolyamide contains 30 mole percent terephthalic residues out of a total of 100 mole percent acid residues. Thus, there are 30 moles of terephthalic residues among every 100 moles of acid residues. In another example, a copolyamide containing 30 mole percent m-xylylenediamine, based on the total diamine residues, means that the copolyester contains 30 mole percent m-xylylenediamine residues out of a total of 100 mole percent diamine residues. Thus, there are 30 moles of m-xylylenediamine residues among every 100 moles of diamine residues.

Any method known in the art can be used to produce the polyamides. The polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80 to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration.

The molecular weight is controlled by the diacid-diamine ratio. An excess of diamine produces a higher concentration of terminal amino groups. For oxygen-scavenging compositions, it is advantageous to adjust the diacid-diamine ratio to produce the concentration of terminal amine groups to 20 mmole/kg or less. If the diacid-diamine complex is prepared in a separate step, excess diamine is added prior to the polymerization. The polymerization can be carried out either at atmospheric pressure or at elevated pressures.

To exhibit satisfactory clarity and low haze, the second component and first component of the immiscible blend typically have refractive indices which differ by about 0.006 to about –0.0006, that is, the RI(second component)–RI(first component) is about 0.006 to about –0.0006. Other examples of differences in the absolute value of the refractive indices are about 0.005 to about –0.0006, about 0.004 to about –0.0006, about 0.003 to about –0.0006, about 0.005 to about –0.0005, and about 0.004 to about –0.0005. Persons of skill in the art will understand, however, that the difference in refractive indices which may be acceptable depends on the blend composition, particle diameter, refractive index, wavelength, and particle structure as described by Biangardi et al., *Die Angew. Makromole. Chemie*, 183, 221 (1990).

The immiscible blend of the instant invention has excellent clarity and has a % transmittance of at least 75%, as determined by ASTM Method D1003, and a haze of 10% or less. Other examples of % transmittance are at least 77%, at least 80%, and at least 85%. Additional examples of haze values which may be exhibited by the blends of the invention are 9% or less, 7% or less, 5% or less, and 3% or less. For the compositions of the invention, haze is determined by molding or casting the composition into a sheet or film having a thickness of ⅛ inch or less and measuring the haze according to the procedure described in the examples. For shaped articles, including multilayer shaped articles, the haze can be determined by cutting out a small (i.e., 1×1 cm) section of the article, having a thickness of ⅛ inch or less, and measuring the haze according the procedure given in the examples.

The first component also may comprise homogeneous blend of one or more polymers. For example, the first component may comprise a homogeneous blend of a first polyester with one or more polymers chosen from a polycarbonate, a second polyester, and a polyarylate. The polyester may be any polyester as described herein. For example, the first component may comprise a homogeneous blend of a polyester and a polycarbonate comprising the residues of bisphenol A.

The polycarbonate may comprise about 90 to 100 mole percent, based on the total moles of diol residues, of the residues bisphenol A, and from 0 to about 10 mole percent of the residues of one or more modifying aliphatic diols or dihydric phenols having from 2 to 16 carbons. Representative examples include bis(4-hydroxyphenyl)methane; 2,2-bis(4-hydroxyphenyl)propane ("bisphenol-A"); 2,2-bis(4-hydroxy-3-methylphenyl)propane; 4,4-bis(4-hydroxyphenyl)heptane; 2,2-bis(4-hydroxy-3,5-dichlorophenyl)propane; 2,2-bis(4-hydroxy-3,5-dibromophenyl)propane; dihydric phenol ethers such as, for example, bis(4-hydroxyphenyl)ether; bis(3,5-dichloro-4-hydroxyphenyl)ether; dihydroxydiphenyls such as, for example, p,p'-dihydroxydiphenyl, 3,3'-dichloro-4,4'-dihydroxydiphenyl; dihydroxyaryl sulfones such as, for example, bis(4-hydroxyphenyl)sulfone; bis(3,5-dimethyl-4-hydroxyphenyl)sulfone; dihydroxy benzenes such as, for example, resorcinol; hydroquinone; halo- and alkyl-substituted dihydroxy benzenes such as, for example, 1,4-dihydroxy-2,5-dichlorobenzene; 1,4-dihydroxy-3-methylbenzene; and dihydroxy diphenyl sulfoxides such as, for example, bis(4-hydroxyphenyl)sulfoxide; and bis(3,5-dibromo-4-hydroxyphenyl)sulfoxide. A variety of additional dihydric phenols are also available such as are disclosed, for example, in U.S. Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl)propane and 2,2-bis(3,5-dibromo-4-hydroxyphenyl)propane. It is also possible to employ two or more different dihydric phenols or a copolymer of a dihydric phenol with a glycol, with hydroxy or acid terminated polyester, or with a dibasic acid as well as blends of any of the above materials. Suitable dicarboxylic acids include, but are not limited to, aromatic dicarboxylic acids such as phthalic, isophthalic, terephthalic, o-phthalic, o-, m-, and p-phenylenediacetic acids, and polynuclear aromatic acids such as, for example, diphenic acid and 1,4-naphthalic acid.

Representative examples of aliphatic diols include ethylene glycol, propanediols, butanediols, pentanediols, hexandiols, heptanediols, octanediols, neopentyl glycol, aryl-alkyl glycols such as styrene glycol, xylylene glycols, dihydroxy alkyl ethers of dihydric phenols such as the dihydroxy ethyl ether of Bisphenol-A, and the like. Other examples of aliphatic diols are higher molecular weight aliphatic dihydroxy compounds such as, for example, polyethylene glycols, polystyrene glycols, polypropylene glycols, polybutylene glycols, polythioglycols, poly-arylalkyl ether glycols and copolymer polyether glycols. Additional representative examples of dihydric phenols and aliphatic diols are described in U.S. Pat. Nos. 3,030,335 and 3,317,466. The polycarbonate may further comprise the residues of one or more branching agents such as, for example, tetraphenolic compounds, tri-(4-hydroxyphenyl)ethane, pentaerythritol triacrylate and others compounds as disclosed in U.S. Pat. Nos. 6,160,082; 6,022,941; 5,262,511; 4,474,999; and 4,286,083. Other suitable branching agents are mentioned herein below. In a further example, the polycarbonate comprises at least 95 mole percent, based on the total moles of diol residues, of the residues of bisphenol A.

The inherent viscosity of the polycarbonate portion of the blends according to the present invention is preferably at least about 0.3 dL/g, more preferably at least 0.5 dL/g. The melt flow of the polycarbonate portion of the blends according to the present invention is preferably between 1 and 20, and more preferably between 2 and 18, as measured according to ASTM Method D1238 at a temperature of 300° C. and using a weight of 1.2 kg.

Processes for the preparation of polycarbonates are well known in the art. The linear or branched polycarbonates that can be used in the invention and disclosed herein are not limited to or bound by the polycarbonate type or its production method. Generally, a dihydric phenol, such as bisphenol A, is reacted with phosgene with the use of optional monofunctional compounds as chain terminators and tri-functional or higher functional compounds as branching or crosslinking agents. Monofunctional, difunctional, and trifunctional reactive acyl halides also can used in the preparation of polycarbonates as terminating compounds (mono-functional), comonomers (di-functional), or branching agents (tri-functional or higher).

For example, the polycarbonate portion of the present blend can be prepared in the melt, in solution, or by interfacial polymerization techniques well known in the art. Suitable methods include the steps of reacting a carbonate source with a diol at a temperature of about 0° C. to 315° C. at a pressure of about 0.1 to 760 mm Hg for a time sufficient to form a polycarbonate. Commercially available polycarbonates that can be used in the present invention, are normally made by reacting an aromatic diol with a carbonate source such as, for example, phosgene, dibutyl carbonate, or diphenyl carbonate, to incorporate 100 mole percent of carbonate units, along with 100 mole percent diol units into the polycarbonate.

Other representative examples of methods of producing polycarbonates are described in U.S. Pat. Nos. 5,498,688; 5,494,992; and 5,489,665.

Blends of the of polyesters and polycarbonates can be made by methods which include the steps of blending the polycarbonate and polyester portions at a temperature of about 25° C. to 350° C. for a time sufficient to form a clear blend composition. Suitable conventional blending techniques include the melt method and the solution-prepared method. Other suitable blending techniques include dry blending and/or extrusion.

The compositions of the present invention, including the immiscible and homogeneous blends contained therein, may be prepared by any method known in the art and are useful as thermoplastic molding compositions and for formation of films and single and multilayered articles. In addition to physically blending the various components of the blend, homogeneous polyesters blends may be prepared by transesterification of the polyester components. Similarly, homogeneous blends of polyamides may be prepared by transamidation of the polyamide components.

The melt blending method includes blending the polymers at a temperature sufficient to melt the first component and second component portions, and thereafter cooling the blend to a temperature sufficient to produce a clear blend. The term "melt" as used herein includes, but is not limited to, merely softening the polymers. Examples of melt mixing methods generally known in the polymers art are described in *Mixing and Compounding of Polymers* (I. Manas-Zloczower & Z. Tadmor eds., Carl Hanser Verlag publisher, N.Y. 1994).

The solution-prepared method includes dissolving the appropriate weight/weight ratio of the first component and second component in a suitable organic solvent such as methylene chloride or a 70/30 mixture of methylene chloride and hexafluoroisopropanol, mixing the solution, and separating the blend composition from solution by precipitation of the blend or by evaporation of the solvent. Solution-prepared blending methods are generally known in the polymers art.

The melt blending method is the preferred method for producing the blend compositions of the present invention. The melt blending method is more economical and safer than the solution method, which requires the use of volatile solvents. The melt blending method also is more effective in providing clear blends. Any of the clear blends of the present invention that can be prepared by solution blending also can be prepared by the melt method. Some of the blends of the present invention, however, can be prepared by the melt method, but not by the solution-prepared method. Any blending process which provides clear blends of the present invention is suitable. One of ordinary skill in the art will be able to determine appropriate blending methods for producing the clear blends of the present invention.

These first and second components of the composition may be compounded in the melt, for example, by using a single screw or twin screw extruder. They may also be prepared by blending in solution. Additional components such as stabilizers, flame retardants, colorants, lubricants, release agents, impact modifiers, and the like may also be incorporated into the formulation. For example, the compositions can be produced via a melt extrusion compounding of the first component and the second component with any other composition components such as, for example, metal catalysts, dyes, toners, fillers, and the like. The composition may be formed by dry blending solid particles or pellets of each of thermoplastic polymers and the polyamide components and then melt blending the mixture in a suitable mixing means such as an extruder, a roll mixer, or the like. When a transamidized, homogeneous blend of polyamides is used as the second component, it is advantageous to conduct the processing at a temperature that will cause transamidation between the polyamides to occur. Typically, these temperatures range from about 270° C. to about 350° C. Other examples of transamidation temperatures are about 280° C. to about 350° C. and about 290° C. to about 340° C. Blending is conducted for a period of time that will yield a well dispersed, immiscible blend. Such may easily be determined by those skilled in the art. If desired, the composition may be cooled and cut into pellets for further processing, it may be extruded into films, sheets, profiles, and other shaped elements, injection or compression molded to form various shaped articles, or it may be formed into films and optionally uniaxially or biaxially stretched by means well known in the art.

The amounts of the first and second components in the immiscible blend may vary widely. For example, the immiscible blend of our novel composition may comprise about 5 to about 99 weight percent of the first component and about 95 to about 1 weight percent of the second component, based on the total weight of the composition. Other non-limiting, representative examples of weight percentages of the first and second components include about 50 to about 99 weight percent of the first component and about 50 to about 1 weight percent of the second component, about 60 to about 99 weight percent of the first component and about 40 to about 1 weight percent of the second component, and about 70 to about 99 weight percent of the first component and about 30 to about 1 weight percent of the second component.

Our invention also provides a composition comprising an immiscible blend prepared by a process comprising melt blending:
(i) a first component comprising at least one thermoplastic polymer selected from polyesters, polycarbonates, polyarylates, and homogeneous blends thereof; and
(ii) a second component comprising a homogeneous, transamidized blend of at least 2 polyamides;
wherein the second component (ii) and the first component (i) have a difference in refractive index, RI(second component)–RI(first component), of about 0.006 to about –0.0006, and the immiscible blend has a percent transmittance of at least 75%, and a haze of 10% or less. The composition includes the various embodiments of the polyesters, polycarbonates, polyarylates, homogeneous blends, and polyamides as described above and any combination thereof. For example, the second component of the composition can comprise a homogeneous, transamidized blend of at least 2 polyamides in which transamidation may be accomplished by contacting the polyamides at elevated temperatures, typically from about 270° C. to about 350° C. Other examples of transamidation temperatures are about 280° C. to about 350° C. and about 290° C. to about 340° C.

The homogeneous blend of component (ii) can comprise a first polyamide, comprising aromatic residues, and a second polyamide comprising aliphatic residues, as described previously. For example, typical polyamides that can be used as the second polyamide include, but are not limited to, nylon 4; nylon 6; nylon 9; nylon 11; nylon 12; nylon 6,6; nylon 5,10; nylon 6,12; nylon 6,11; nylon 10,12; and combinations thereof. In addition to the polyesters described previously, the first component can comprise a homogeneous blend of a polyester and a polycarbonate comprising the residues of bisphenol A.

Another aspect of the instant invention is a method for preparation of a transparent polymer blend, comprising:

(A) selecting a first component comprising at least one thermoplastic polymer selected from polyesters, polycarbonates, polyarylates, and homogeneous blends thereof;
(B) determining the refractive index of the first component;
(C) providing a second component comprising
(i) a copolyamide having a mole ratio of aliphatic and aromatic residues, wherein the mole ratio of aliphatic and aromatic residues is selected to produce a second component refractive index that satisfies the following formula:

$0.006 \geq RI(\text{second component}) - RI(\text{first component}) \geq -0.0006$ or;
(ii) a homogeneous, transamidized blend of a first and second polyamide, at least one of the polyamides having aromatic residues, wherein the weight percentage of the first and second polyamide is selected to produce a second component refractive index that satisfies the following formula:

$0.006 \geq RI(\text{second component}) - RI(\text{first component}) \geq -0.0006$ wherein RI is refractive index; and
(D) melt blending the first and second components to produce an immiscible blend having a percent transmittance of at least 75%, and a haze of 10% or less.

Our method includes the various embodiments of the polyesters, polycarbonates, polyarylates, homogeneous blends, copolyamides, and polyamides as described previously and any combination thereof. Our method comprises selecting the first component which may be a polyester, polycarbonate, polyarylate or homogeneous blend thereof. The refractive index of the first component may be determined using methods well known to persons skilled in the art. The second component, which may comprise as single copolyamide or a transamidized, homogeneous blend of at least two polyamides, is tailored to closely match the refractive index of the first component by selecting the appropriate mixture of aromatic and aliphatic monomers in the case of a copolyamide, or by selecting a mixture of polyamides containing the desired mixture of aromatic and aliphatic residues if a homogeneous blend of polyamides is used. The choice of the proper ratio of monomers or of polyamides can be determined, for example, by trial and error, or, in another example, by plotting the refractive index of various polyamides or copolyamides containing varying amounts of aromatic residues and aliphatic residues, and selecting the molar ratio of aromatic: aliphatic residues or the weight percentage ratio of polyamides that will give the targeted refractive index. The first and second components may be melt blended. When the second component comprises a transamidized, homogeneous blend of at least 2 polyamides, it is desirable to carry out the melt blending step at a temperature effective for the transamidation process. Typical transamidation temperature ranges are as described previously.

The thermoplastic polymers also may be selected to match the refractive index of the second component. Thus, another aspect of the invention is a method for the preparation of a transparent polymer blend, comprising:
(A) selecting a second component comprising
(i) a copolyamide having a mole ratio of aliphatic and aromatic residues; or
(ii) a homogeneous, transamidized blend of a first and second polyamide, at least one of the polyamides having aromatic residues;
(B) determining the refractive index of the second component;

(C) providing a first component comprising at least one thermoplastic polymer selected from polyesters, polycarbonates, polyarylates, and homogeneous blends thereof wherein the polyester, polycarbonate, polyarylate, or homogeneous blend thereof is selected to produce a first component refractive index that satisfies the following formula:

$$0.006 \geq RI(\text{second component}) - RI(\text{first component}) \geq -0.0006$$

wherein RI is refractive index; and (D) melt blending the first and second components to produce an immiscible blend having a percent transmittance of at least 75%, and a haze of 10% or less. It is further understood that the above method also includes any combination of the various embodiments of the polyesters, polycarbonates, polyarylates, homogeneous blends, copolyamides, polyamides described previously.

In one example, the blending of thermoplastic polymers to obtain a second component and first component that have a difference in refractive index of about 0.006 to about −0.0006 may be illustrated with particular reference to polycarbonate/polyester blends. For example, the complete miscibility of a polycarbonate of bisphenol A and PCTG permits the tailoring of refractive index (RI) of the polycarbonate/PCTG blend, by adjusting the polycarbonate/PCTG ratio. By adjusting the polycarbonate ratio. the refractive index of the first component of the present invention may be matched to within about 0.006 to about −0.0006 of that of the second component comprising the polyamide barrier polymers. For example, a polymer may be determined to be a suitable modifying polymer of the homogeneous polyester/polycarbonate blends described hereinabove if a clear blend is formed by: 1) blending the modifying polymer with a pre-existing blend containing the polycarbonate and polyester portions, or 2) blending the modifying polymer with the polycarbonate portion prior to the introduction of the polyester portion, or 3) blending the modifying polymer with the polyester portion prior to the introduction of the polycarbonate portion, or 4) mixing the modifying polymer, polycarbonate portion and polyester portion all together prior to blending.

The clear blends of the present invention can still be modified by the incorporation of modifying polymers to produce performance blends, which may not necessarily be clear. For example, polyamides such as nylon 6,6 from DuPont, poly(ether-imides) such as ULTEM poly(ether-imide) from General Electric, polyphenylene oxides such as poly(2,6-dimethylphenylene oxide) or poly(phenylene oxide)/polystyrene blends such as the NORYL resins from General Electric, polyesters, polyphenylene sulfides, polyphenylene sulfide/sulfones, poly(ester-carbonates) such as LEXAN 3250 poly(ester-carbonate) (General Electric), polycarbonates other than LEXAN polycarbonate from General Electric, polyarylates such as ARDEL D100 polyarylate (Amoco), polysulfones, polysulfone ethers, poly(ether-ketones) or aromatic dihydroxy compounds can be used as blend modifiers to modify properties or to reduce flammability. Some of the aromatic dihydroxy compounds used to prepare these polymers are disclosed in U.S. Pat. No. 3,030,335 and U.S. Pat. No. 3,317,466.

The copolyamide or homogeneous blend of polyamides of the composition of the invention can function as a barrier polymer and, as such, improve the barrier properties of the overall composition. The term "barrier polymer," as used herein, means a polymer having one or more of the following properties: (1) a water permeability of 2 gm-mils/100 sq in/24 hr or less, as measured by ASTM Method No. F1249 at 38° C.; (2) an oxygen permeability of 5 cc(STP)-mils/100 sq in/24 hrs-atm or less, as measured by ASTM Method No. D3985 at 23° C., or (3) a carbon dioxide permeability of 25 cc(STP)-mils/100 sq in/24 hrs atm or less, as measured by ASTM Method No. D1434 at 23° C.

The barrier properties may be enhanced by incorporating a metal catalyst to produce an oxygen scavenging composition which catalyzes the reaction of oxygen with one or more polyamides in the composition. Our invention, therefore, further provides an oxygen-scavenging composition comprising:

(A) an immiscible blend comprising
　(i) first component comprising at least one thermoplastic polymer selected from polyester, polycarbonate, polyarylate, and homogeneous blends thereof;
　(ii) a second component comprising a transamidized, homogeneous blend of at least two polyamides;
　wherein the second component (ii) and the first component (i) have a difference in refractive index, RI(second component)−RI(first component), of about 0.006 to about −0.0006, and the immiscible blend has a percent transmittance of at least 75%, and a haze of 10% or less; and
(B) at least one metal selected from Groups 3-12, Rows 4-6 of the Periodic Table of the Elements.

In addition to a homogeneous blend of one or polyamides, the oxygen-scavenging compositions of the invention also may include a single copolyamide as described hereinabove for the other embodiments of the invention. Thus, the invention also provides an oxygen-scavenging composition comprising:

(A) an immiscible blend comprising
　(i) first component comprising at least one thermoplastic polymer selected from polyester, polycarbonate, polyarylate, and homogeneous blends thereof;
　(ii) a second component comprising a copolyamide;
　wherein the second component (ii) and the first component (i) have a difference in refractive index, RI(second component)−RI(first component), of about 0.006 to about −0.0006, and the immiscible blend has a percent transmittance of at least 75%, and a haze of 10% or less; and
(B) at least one metal selected from Groups 3-12, Rows 4-6 of the Periodic Table of the Elements.

It should be further understood the oxygen scavenging compositions include any combination of the various embodiments of the first and second components, polyesters, polycarbonates, polyarylates, homogeneous blends, copolyamides, and polyamides described hereinabove.

The oxygen-scavenging compositions of the invention can include one metal selected from Groups 3-12, Rows 4-6 of the Periodic Table of the Elements as set forth in the 1984 revision of the Periodic Table by the Internation Union of Pure and Applied Chemistry. Typical oxidation catalysts include transition metal catalysts which can readily interconvert between at least two oxidation states. Examples of metals which can be used include copper, nickel, cobalt, iron, manganese, and combinations thereof. Any amount of catalyst which is effective in catalyzing oxygen scavenging may be used but, typically, the metal will be used in amounts from about 10 ppm to about 1,000 ppm. Other ranges of metal concentration include, about 50 ppm to about 750 ppm, about 10 to about 500 ppm, about 50 ppm to about 500 ppm, and about 50 to about 300 ppm based on the total weight of the oxygen-scavenging composition. The metal typically may be used as the elemental metal itself, as a metal complex containing organic ligands, as an oxide, or as a metal salt. Examples of counterions for metal salts include, but are not limited to, chloride, acetate, acetylacetonate, stearate, palmitate, 2-ethylhexanoate, neodecanoate, octanoate, or naphthenate, and mixtures thereof. The metal salt may also be an ionomer, in which case a polymeric counterion is employed. Such ionomers are well known in the art.

In one example, the metal catalyst is cobalt or a compound containing cobalt such as, for example, a cobalt salt. The cobalt may be in the +2 or +3 oxidation state. Other examples of metal catalysts are rhodium in the +2 oxidation state and copper in the +2 oxidation state. The metals may be added in salt form, conveniently as carboxylate salts such as, for example, cobalt octanoate, cobalt acetate, or cobalt neodecanoate. The reported amounts are based on the weight of the polymer blends and measured on the metal, not its compound weight as added to the composition. In the case of cobalt as the metal, typical amounts are at least 50 ppm, or at least 60 ppm, or at least 75 ppm, or at least 100 ppm, or at least 125 ppm. The catalyst can be added neat or in a carrier (such as a liquid or wax) to an extruder or other device for making an article, or it can be added in a concentrate with a polyamide polymer, in a concentrate with a polyester polymer, or in a concentrate with the immiscible blend. The carrier may either be reactive or non-reactive with the first and second component and either volatile or non-volatile carrier liquids may be employed. The metal catalyst may be added at a variety of points and by way of a variety of blending protocols during the preparation of the oxygen scavenging composition. A particularly useful approach is to bring the polyamide and transition metal together late in the preparation of the final blend composition, even as late as in the final melt step before forming the article, so that the oxygen scavenging activity of the polyamide is not prematurely initiated. In some instances, such as when cobalt is provided as a transition metal, it may be preferred to add the cobalt during blending of first and second components, instead of, for example, during the preparation of the thermoplastic polymers.

In one embodiment, for example, the first component of the oxygen-scavenging composition can comprise a polyester having any combination of monomer residues as described previously. For example, the polyester can comprise (a) diacid residues comprising at least 80 mole percent, based on the total diacid residues, of the residues of at least one dicarboxylic acid selected from terephthalic acid, isophthalic acid, naphthalenedicarboxylic acid, and 1,4-cyclohexanedicarboxylic acid, and 0 to about 20 mole percent of the residues of at least one modifying dicarboxylic acid having 2 to 20 carbon atoms; and (b) diol residues comprising at least 80 mole percent, based on the total moles of diol residues, of the residues of at least one diol selected from ethylene glycol, 1,4-cyclohexanedimethanol; neopentyl glycol, diethylene glycol, 1,3-propanediol, 1,4-butanediol, and, 2,2,4,4-tetramethyl-1,3-cyclobutanediol; and from 0 to about 20 mole percent of the residues of at least one modifying diol having from 3 to 16 carbons. In another example, the diacid residues can comprise about 60 to 100 mole percent of the residues of terephthalic acid and 0 to about 40 mole percent of the residues of isophthalic acid and the diol residues can comprise about 100 mole percent of the residues of 1,4-cyclohexanedimethanol. In another example, the diacid residues can comprise about 100 mole percent, based on the total moles of diacid residues, of the residues of terephthalic acid. Other specific examples of polyesters that may be used as the first component include polyesters comprising: (i) about 80 to about 100 mole percent of the residues of terephthalic acid and about 50 to about 90 mole percent of the residues 1,4-cyclohexanedimethanol and about 10 to about 50 mole percent neopentyl glycol; (ii) about 100 mole percent of the residues of terephthalic acid and about 10 to about 40 mole percent of the residues of 1,4-cyclohexanedimethanol and 60 to about 90 mole percent of the residues of ethylene glycol; and (iii) about 100 mole percent of the residues of terephthalic acid and about 10 to about 99 mole percent of the residues of 1,4-cyclohexanedimethanol, 0 to about 90 mole percent of the residues of ethylene glycol, and about 1 to about 25 mole percent of the residues of diethylene glycol. The polyester may also further comprise about 0.1 to 2 mole %, based on the total diacid residues, of the residues of at least one branching agent selected from trimellitic acid, trimellitic anhydride, and pyromellitic dianhydride as described hereinabove.

The first component may also comprise a homogeneous blend of at least one polyester and at least one polycarbonate. The polycarbonates that can be used in these homogeneous blends have been described previously.

The transamidized, homogeneous blend or the copolyamide can comprise any polyamide as described previously such as for example, various nylons. It is advantageous, however, that the copolyamide or homogeneous blend of polyamides of the oxygen-scavenging composition comprise the residues of m-xylylenediamine, p-xylylenediamine, or a combination thereof. For example, the second component may comprise a homogeneous blend of a first polyamide comprising the residues of m-xylylenediamine and adipic acid, and a second polyamide comprising nylon 6, nylon 6,6, or blends thereof. As a further example, this homogeneous blend may be combined in an immiscible blend with a first component comprising a homogeneous blend of the polyester and a polycarbonate comprising the residues of bisphenol A. It is desirable also for optimum oxygen scavenging properties that the copolyamide or homogeneous blend of polyamides contain 20 mmoles/kg or less of free amino groups. The concentration of free amino groups can be determined using techniques well known to persons having ordinary skill in the art such as, for example, by titration.

In another example, the oxygen scavenging composition comprises a copolyamide of m-xylylenediamine adipate. The use of a modified m-xylylenediamine adipate, in which some of the adipic acid residues, or some of the m-xylylenediamine residues, or some of both, are replaced with other residues, can give an oxygen-scavenging composition with improved oxygen-scavenging properties when compared with compositions containing only the m-xylylenediamine adipate homopolymer. Other polyamide barrier polymers, as described herein, may also be used as part of the oxygen scavenging composition.

The compositions of the present invention described hereinabove may be used to fabricate shaped articles such as, for example, sheets, films, tubes, preforms, bottles, or profiles. Such articles may be formed by any means well known to persons skilled in the art such as, for example, by extrusion, calendering, thermoforming, blow-molding, extrusion blow-molding, injection molding, compression molding, casting, drafting, tentering, or blowing.

For example, the compositions of the present invention may be fabricated into shaped articles such as, for example, films, by any technique known in the art. Formation of films can be achieved by melt extrusion, as described, for example, in U.S. Pat. No. 4,880,592, or by compression molding as described, for example, in U.S. Pat. No. 4,427,614, or by any other suitable method. For example, films may be produced by the well known cast film, blown film and extrusion coating techniques, the latter including extrusion onto a substrate. Such a substrate may also include a tie-layer. Films produced by melt casting or blowing can be thermally bonded or sealed to a substrate using an adhesive. The compositions may be fabricated into monolayer or multilayer films by any technique known in the art. For example, monolayer, or multilayer films may be produced by the well known cast film, blown film and extrusion coating techniques, the latter including extrusion onto a substrate. Representative substrates include films, sheets, and woven and nonwoven fabrics. Monolayer, or multilayer films produced by melt casting or blowing can be thermally bonded or sealed to a substrate using an adhesive.

For example, the composition may be formed into a film using a conventional blown film apparatus. The film forming apparatus may be one which is referred to in the art as a "blown film" apparatus and includes a circular die head for bubble blown film through which the composition is forced and formed into a film "bubble." The "bubble" is ultimately collapsed and formed into a film.

The compositions also may be used to form shaped articles through extrusion blow molding and injection stretch-blow molding. An injection molding process softens the copolyamide or homogeneous polyamide blend in a heated cylinder, injecting it while molten under high pressure into a closed mold, cooling the mold to induce solidification, and ejecting the molded preform from the mold. Molding compositions are well suited for the production of preforms and subsequent reheat stretch-blow molding of these preforms into the final bottle shapes having the desired properties. The injection molded preform is heated to suitable orientation temperature in the 100° C. to 150° C. range and then stretch-blow molded. The latter process consists of first stretching the hot preform in the axial direction by mechanical means such as by pushing with a core rod insert followed by blowing high pressure air (up to 500 psi) to stretch in the hoop direction. In this manner, a biaxially oriented blown bottle is made. Typical blow-up ratios range from 5/1 to 15/1.

The excellent transparency and low haze of the compositions of the invention enable the preparation of transparent, shaped articles with the incorporation of substantial amounts of scrap polymer or "regrind." The term "regrind," as used herein, is understood to have its commonly accepted meaning in art, that is, scrap polymer that recovered from an article forming process and ground into smaller particles. Often, regrind is sold as scrap for incorporation into shaped articles in which the transparency of the article is immaterial to its application. For certain shaped articles such as, for example, bottles and films used in packaging applications, low haze and high transparency are important features. The manufacture of these articles, in particular, multilayered articles, inherently produces large quantities of scrap polymer which frequently cannot be returned to the article-forming process because of the formation of unacceptable levels of haze. Because of the close match in the refractive indices of the first and second components, low haze, transparent, shaped articles may be produced from the compositions of the invention with the inclusion of regrind.

Another aspect of our invention, therefore, is a process for forming a shaped article, comprising:

(A) melt blending
  (i) a first component comprising at least one thermoplastic polymer selected from polyesters, polycarbonates, polyarylates, and homogeneous blends thereof; and
  (ii) a second component comprising a copolyamide or a homogeneous, transamidized blend of at least 2 polyamides;
  wherein the first component (i) and second component (ii) form an immiscible blend, the second component and the first component have a difference in refractive index, RI(second component)–RI(first component), of about 0.006 to about –0.0006, and the immiscible blend has a percent transmittance of at least 75%, and a haze of 10% or less;
(B) forming a shaped article;
(C) recovering a scrap polymer composition comprising the blended first and second components (i) and (ii);
(D) grinding the scrap polymer composition to produce a polymer regrind;
(E) optionally, drying the scrap polymer composition; and
(F) combining the polymer regrind with the first and second components (i) and (ii) of step (A).

Our process, thus, permits the incorporation of scrap polymer regrind into the shaped article with retention of low haze and high transparency. It should be further understood the above process includes the various embodiments of the first and second components, polyesters, polycarbonates, polyarylates, homogeneous blends, copolyamides, polyamides, oxygen-scavenging compositions, and any combination thereof described hereinabove.

For example, as described previously, the immiscible blend formed from the first and second components may further comprise at least one metal selected from Groups 3-12, Rows 4-6 of the Periodic Table of the Elements. Examples of metals include copper, nickel, cobalt, iron, manganese, and combinations thereof. Typically, the metal is present in amounts of about 10 to about 500 parts per million by weight of the metal, based on the total weight of the shaped article. The preferred metal is cobalt.

The shaped article of our inventive process may be formed by any methods known in the art and described hereinabove. For example, the shaped article may be formed by extrusion, calendering, thermoforming, blow-molding, extrusion blow-molding, injection molding, compression molding, casting, drafting, tentering, or blowing.

Although the process of the invention may be used to prepare any shaped article, representative articles that may be produced are sheets, films, preforms, tubes, and bottles. These article may have a single layer or contain from 2 to about 7 layers. The regrind may be incorporated into one or more of these layers which may comprise from about 50 to 100 weight percent regrind based on the weight of the one or more layers. Other examples of regrind levels that can be present in the shaped article are 5 to about 95 weight percent, about 10 to about 60 weight percent, about 15 to about 50 weight, and about 20 to about 30 weight percent.

The shaped article may comprise multiple layers in which one or more of the layers comprise the first and second component as an immiscible blend or in which the first component and the second component are present in separate layers. Thus, another aspect of the instant invention, is a multilayered, shaped article, comprising:

(i) a first layer comprising at least one thermoplastic polymer selected from polyester, polycarbonate, polyarylate, and homogeneous blends thereof; and
(ii) a second layer comprising a transamidized homogeneous blend of at least two polyamides;
  wherein the second layer (ii) and the first layer (i) have a difference in refractive index, RI(second layer)–RI(first layer), of about 0.006 to about –0.0006, and the shaped article has a percent transmittance of at least 75%, and a haze of 10% or less.

The shaped article may include the various embodiments of the first and second components, polyesters, polycarbonates, polyarylates, homogeneous blends, copolyamides, polyamides, oxygen-scavenging compositions, shaped articles, and any combination thereof described hereinabove.

The multilayered shaped article may be produced by extrusion, calendering, thermoforming, blow-molding, extrusion blow-molding, injection molding, compression molding, casting, drafting, tentering, or blowing. Because of the close match between the refractive indices of the first and second layers, the multilayered article may further comprise a regrind comprising a mixture of the first and second layers, which may be incorporated into first layer, second layer, or a combination of the first and second layer. Typically, the regrind is about 5 weight percent to about 60 weight percent of the multilayered article, based on the total weight of the article. Other examples of weight percentages of regrind in the shaped article are about 10 weight percent to about 40 weight percent and about 20 weight percent to about 30 weight percent of the total weight of the article.

The multilayered article can have from 2 to about 7 layers depending on its intended application. For example, as described above, the shaped article may be a sheet, film, tube, bottle, or preform. Complex layered structures are possible also. For example, the shaped article can have a layered structure represented by ABA, ABABA, ABCBA, or ACBCA in which layer A comprises the first layer (i), layer B comprises the second layer (ii), and layer C comprises a regrind comprising a mixture of scrap first and second layers (i) and (ii), polyester or polycarbonate obtained from post consumer recycle, or a combination thereof. Depending on the composition of the regrind, it can be advantageous that layer B and layer C have a difference in refractive index, RI(layer B)–R(layer C), of about 0.006 to about –0.0006 to maintain the transparency of the article and the ability to incorporate regrind.

In another embodiment, layer A can comprise the second layer (ii), layer B comprises the first layer (i) and layer C comprises a mixture of scrap first and second layers (i) and (ii), polyester or polycarbonate obtained from post consumer recycle, or a combination thereof.

In addition, the second layer (ii) of our novel multilayered article can further comprise at least one metal selected from Groups 3-12, Rows 4-6 of the Periodic Table of the Elements. Examples of metals include copper, nickel, cobalt, iron, manganese, and combinations thereof. Typically, the metal is present in amounts of about 10 to about 500 parts per million by weight of the metal, based on the total weight of the shaped article. The preferred metal is cobalt.

In yet another embodiment, the multilayered, shaped article of the invention can further comprise at least one additional layer comprising about 50 to about 100 weight percent of regrind, based on the total weight of the layer. The additional layer containing the regrind can further comprise at least one metal selected from Groups 3-12, Rows 4-6 of the Periodic Table of the Elements. Examples of metals include copper, nickel, cobalt, iron, manganese, and combinations thereof. Typically, the metal is present in amounts of about 10 to about 500 parts per million by weight of said metal, based on the total weight of said shaped article. The preferred metal is cobalt.

As noted above, the multilayered, shaped article may comprise the various embodiments of the shaped articles, thermoplastic polymers, polyamides, immiscible blends, homogeneous blends, and oxygen scavenging compositions as described earlier. For example, the at least one thermoplastic polymer may comprise a linear or branched polyester comprising at least 80 mole percent, based on the total diacid residues, of the residues of at least one dicarboxylic acid selected from terephthalic acid, isophthalic acid, naphthalenedicarboxylic acid, and 1,4-cyclohexanedicarboxylic acid, and 0 to about 20 mole percent of the residues of at least one modifying dicarboxylic acid having 2 to 20 carbon atoms; and (b) diol residues comprising at least 80 mole percent, based on the total moles of diol residues, of the residues of at least one diol selected from ethylene glycol, 1,4-cyclohexanedimethanol; neopentyl glycol, diethylene glycol, 1,3-propanediol, 1,4-butanediol, and, 2,2,4,4-tetramethyl-1,3-cyclobutanediol; and from 0 to about 20 mole percent of the residues of at least one modifying diol having from 3 to 16 carbons; and the one or more barrier polymers comprise a homogeneous blend of a first polyamide comprising the residues of m-xylylenediamine and adipic acid, and a second polyamide comprising nylon 6, nylon 6,6, or blends thereof. For example, the thermoplastic polymer may comprise a branched polyester. In a further example, the thermoplastic polymer further comprise a homogeneous blend of the polyester and a polycarbonate comprising the residues of bisphenol A.

The multilayered, shaped articles of the present invention may be prepared by any method known to persons of ordinary skill in the art. For example, the shaped articles can be formed by any conventional technique for forming films, including lamination, extrusion lamination, coinjection, stretch-blow molding and coextrusion blowmolding, and may be illustrated with particular reference to a typical method for making multilayer film by coextrusion. For example, the first and second components, as well as any optional layers, are fed into infeed hoppers of the extruders of like number, each extruder handling the material for one or more of the layers. Typically, for compositions of the present invention, the first and second components each will be heated to a temperature of about Tg+100° C. to about Tg+300° C. before and during extrusion, wherein Tg is the glass transition temperature of the first or second component as measured by differential scanning calorimetry. The melted streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is referred to in the art as a blown film apparatus and includes a multi-manifold circular die head for bubble blown film through which the film composition is forced and formed into a film bubble which may ultimately be collapsed and formed into a film. Processes of coextrusion to form film and sheet laminates are generally known. Alternatively the individual layers may first be formed into sheets and then laminated together under heat and pressure with or without intermediate adhesive layers.

The transparency and low haze of the compositions of the invention also enable the preparation of multilayered, transparent, shaped articles with the incorporation of substantial amounts of scrap polymer or "regrind." Our invention, therefore, also provides a process for forming a multilayered, shaped article, comprising:

(i) heating a first component comprising at least one thermoplastic polymer selected from polyesters, polycarbonates, polyarylates, and homogeneous blends thereof to a temperature of about Tg+100° C. to about Tg+300° C. of the first component;

(ii) heating a second component comprising a copolyamide or a transamidized, homogeneous blend of at least two polyamides to a temperature of about Tg+100° C. to about Tg+300° C. of the second component;

(iii) forming a shaped article having the first and second components in separate layers;
(iv) recovering scrap first and second components;
(v) grinding the scrap first and second components to produce a regrind;
(vi) optionally, drying the regrind; and
(vii) combining the regrind with the first component, second component, or a combination thereof, of steps (i) and (ii);

wherein the second component of step (ii) and the first component of step (i) of have a difference in refractive index, RI(second component)–RI(first component), of about 0.006 to about –0.0006, and the shaped article has a percent transmittance of at least 75%, and a haze of 10% or less. The process may include the various embodiments of the first and second components, polyesters, polycarbonates, polyarylates, homogeneous blends, copolyamides, polyamides, oxygen-scavenging compositions, shaped articles, article-forming processes, and any combination thereof described hereinabove.

Our process enables the incorporation of substantial amounts of regrind into shaped article while maintaining low haze and high transparency. The regrind will typically comprise a mixture of the first and second components of steps (i) and (ii) that are produced as scrap during the article-forming process, but any polymer material can be used as long as its refractive index differs from the that second component by about 0.006 to about –0.0006. The regrind material of the process can be combined with the first component of step (i), the second component of step (ii) or a combination of the first and second components. The regrind can be from about 5 weight percent to about 60 weight percent of the shaped article, based on the total weight of the shaped article. Other representative examples of regrind content for the shaped article of the process of the invention are about 10 weight percent to about 40 weight percent of the shaped article and about 20 weight percent to about 30 weight percent of the shaped article.

The multilayered article of our process can have from 2 to about 7 layers depending on its intended application. For example, as described above, the multilayered, shaped article may be a sheet, film, tube, bottle, or preform. Complex layered structures are possible also. For example, the shaped article can have a layered structure represented by ABA, ABABA, ABCBA, or ACBCA in which layer A comprises the first component of step (i), layer B comprises the second component of step (ii), and layer C comprises a regrind comprising a mixture of scrap first and second components from steps (i) and (ii), polyester or polycarbonate obtained from post consumer recycle, or a combination thereof. Depending on the composition of the regrind, it can be advantageous that layer B and layer C have a difference in refractive index, RI(layer B)–R(layer C), of about 0.006 to about –0.0006 to maintain the transparency of the article and the ability to incorporate regrind.

In another embodiment, layer A can comprise the second component of step (ii), layer B comprises the first component of step (i) and layer C comprises a mixture of scrap first and second components of steps (i) and (ii), polyester or polycarbonate obtained from post consumer recycle, or a combination thereof.

In addition, the second component of step (ii) of our novel multilayered article can further comprise at least one metal selected from Groups 3-12, Rows 4-6 of the Periodic Table of the Elements. Examples of metals which can be used include copper, nickel, cobalt, iron, manganese, and combinations thereof. Typically, the metal is present in amounts of about 10 to about 500 parts per million by weight of the metal, based on the total weight of the shaped article. The preferred metal is cobalt.

In yet another embodiment, step (iii) of the process of the invention can further comprise forming at least one additional layer comprising about 50 to about 100 weight percent of regrind, based on the total weight of the layer. The additional layer containing the regrind can further comprise at least one metal selected from Groups 3-12, Rows 4-6 of the Periodic Table of the Elements. Examples of metals include copper, nickel, cobalt, iron, manganese, and combinations thereof. Typically, the metal is present in amounts of about 10 to about 500 parts per million by weight of said metal, based on the total weight of said shaped article. The preferred metal is cobalt.

As noted above, the multilayered, shaped article may comprise the various embodiments of the shaped articles, thermoplastic polymers, polyamides, immiscible blends, homogeneous blends, and oxygen scavenging compositions as described earlier. For example, the at least one thermoplastic polymer may comprise a polyester comprising at least 80 mole percent, based on the total diacid residues, of the residues of at least one dicarboxylic acid selected from terephthalic acid, isophthalic acid, naphthalenedicarboxylic acid, and 1,4-cyclohexanedicarboxylic acid, and 0 to about 20 mole percent of the residues of at least one modifying dicarboxylic acid having 2 to 20 carbon atoms; and (b) diol residues comprising at least 80 mole percent, based on the total moles of diol residues, of the residues of at least one diol selected from ethylene glycol, 1,4-cyclohexanedimethanol; neopentyl glycol, diethylene glycol, 1,3-propanediol, 1,4-butanediol, and, 2,2,4,4-tetramethyl-1,3-cyclobutanediol; and from 0 to about 20 mole percent of the residues of at least one modifying diol having from 3 to 16 carbons; and the one or more barrier polymers comprise a homogeneous blend of a first polyamide comprising the residues of m-xylylenediamine and adipic acid, and a second polyamide comprising nylon 6, nylon 6,6, or blends thereof. For example, the thermoplastic polymer may comprise a branched polyester. In a further example, the thermoplastic polymer further comprise a homogeneous blend of the polyester and a polycarbonate comprising the residues of bisphenol A.

Another embodiment of our invention further is a process for forming a multilayered shaped article, comprising:
(A) heating a first component comprising (i) at least one polyester comprising: (a) diacid residues comprising at least about 95 mole percent, based on the total diacid residues, of the residues of terephthalic acid; and (b) diol residues comprising at least 95 mole percent, based on the total moles of diol residues, of the residues of at least one diol selected from ethylene glycol and 1,4-cyclohexanedimethanol; (ii) at least one polycarbonate comprising the residues of bisphenol A; or (iii) a homogeneous blend thereof to a temperature of about Tg+100° C. to about Tg+300° C. of the first component;
(B) heating a second component comprising a transamidized, homogeneous blend of a polyamide comprising diamine and diacid residues, the polyamide comprising about 100 mole percent, based on the total diamine residues, of the residues of m-xylylenediame and about 100 mole percent, based on the total diacid residues, of the residues of adipic acid, and at least one polyamide selected from nylon 6 and nylon 6,6 to a temperature of about Tg+100° C. to about Tg+300° C. of the second component
(C) forming a shaped article having the first and second polymer compositions in separate layers;
(D) recovering scrap first and second components;

(E) grinding the scrap first and second components to produce a regrind;
(F) optionally, drying the regrind; and
(G) combining the regrind with the first component, second component, or a combination thereof, of steps (A) and (B);
wherein the second component of step (B) and the first component of step (B) have a difference in refractive index, RI(second component)−RI(first component), of about 0.006 to about −0.0006, and the shaped article has a percent transmittance of at least 75%, and a haze of 10% or less. The process may include the various embodiments of the first and second components, polyesters, polycarbonates, polyarylates, homogeneous blends, copolyamides, polyamides, oxygen-scavenging compositions, shaped articles, article-forming processes, and any combination thereof described hereinabove.

As described previously, the regrind may comprise a mixture of the first and second components (i) and (ii) and can be combined with the first component (i), second component (ii), or a combination thereof. The regrind can be from about 5 weight percent to about 60 weight percent of the shaped article, based on the total weight of the shaped article. Other representative examples of regrind content for the shaped article of the process of the invention are about 10 weight percent to about 40 weight percent of the shaped article and about 20 weight percent to about 30 weight percent of the shaped article.

The polyester of the process can comprises diacid residues comprising at least about 95 mole percent of the residues of terephthalic acid and can have a range of diol compositions. For example, the polyester can comprise diol residues comprising about 1 to about 5 mole percent of the residues of 1,4-cyclohexanedimethanol and about 99 to about 95 mole percent of the residues of ethylene glycol. Other examples of diol compositions for the polyester of our process include, but are not limited to: (i) diol residues comprising about 29 to about 33 mole percent of the residues of 1,4-cyclohexanedimethanol and about 71 to about 67 mole percent of the residues of ethylene glycol; (b) diol residues comprising about 45 to about 55 mole percent of the residues of 1,4-cyclohexanedimethanol and about 55 to about 45 mole percent of the residues of ethylene glycol; (iii) residues comprising about 60 to about 65 mole percent of the residues of 1,4-cyclohexanedimethanol and about 40 to about 35 mole percent of the residues of ethylene glycol; (iv) diol residues comprising about 79 to about 83 mole percent of the residues of 1,4-cyclohexanedimethanol and about 21 to about 17 mole percent of the residues of ethylene glycol; and (v) diol residues comprising about 100 mole percent of the residues of 1,4-cyclohexanedimethanol. The polyester may further comprise about 0.1 to 2 mole %, based on the total diacid residues, of the residues of at least one branching agent selected from trimellitic acid, trimellitic anhydride, and pyromellitic dianhydride.

In a further example, the thermoplastic polymer may further comprise a homogeneous blend of the polyester and a polycarbonate comprising the residues of bisphenol A. Each of the polyester and polycarbonate may be linear or branched.

In addition, the second component of step (ii) of our novel process can further comprise at least one metal selected from Groups 3-12, Rows 4-6 of the Periodic Table of the Elements. Examples of metals which can be used include copper, nickel, cobalt, iron, manganese, and combinations thereof. Typically, the metal is present in amounts of about 10 to about 500 parts per million by weight of the metal, based on the total weight of the shaped article. The preferred metal is cobalt.

In yet another embodiment, step (C) of the process of the invention can further comprise forming at least one additional layer comprising about 50 to about 100 weight percent regrind, based on the total weight of the layer. The additional layer containing the regrind can further comprise at least one metal selected from Groups 3-12, Rows 4-6 of the Periodic Table of the Elements. Examples of metals include copper, nickel, cobalt, iron, manganese, and combinations thereof. Typically, the metal is present in amounts of about 10 to about 500 parts per million by weight of said metal, based on the total weight of said shaped article. The preferred metal is cobalt.

The shaped articles of the invention may be further oriented by stretching which may improve the barrier properties of the article. As described earlier, it may be desirable to incorporate other conventional additives or modifying polymers with the polymeric compositions of the present invention. For example, there may be added antioxidants, heat and light stabilizers, dyes, antistatic agents, lubricants, preservatives, processing aids, slip agents, antiblocking agents, pigments, flame retardants, blowing agents, and the like. More than one additive may be used. The additive may be present in any desired amount, but typically are not present at more than about 20 weight percent, preferably not more than 10 weight percent, of the total weight of the shaped article.

The polymer compositions, oxygen-scavenging compositions, and shaped articles prepared therefrom also may comprise up to about 30 weight percent, preferably less than about 20 weight percent, of certain platelet particles derived from at least one layered silicate material to improve their barrier properties. The platelet particles can be modified with at least one ammonium compound. The amount of platelet particles may be determined by measuring the residual ash of the polymer-platelet particle compositions when treated in accordance with ASTM D5630-94. The gas barrier improvement typically increases with increasing concentration of platelet particles in the composite. While amounts of platelet particles as low as about 0.01 percent provide improved barrier (especially when well dispersed and ordered), compositions having at least about 0.5 weight percent of the platelet particles are preferred because they display desirable improvements in gas permeability.

Generally layered silicate materials are a dense agglomeration of platelet particles which are closely stacked together like cards. The platelet particles of the present invention have a thickness of less than about 2 nm and a diameter in the range of about 10 to about 5000 nm. For the purposes of this invention, measurements refer only to the platelet particle and not to the ammonium compounds or any additional dispersing aids and treatment compounds which might be used. Suitable platelet particles are derived from layered silicate materials that are typically free flowing powders having a cation exchange capacity between about 0.3 and about 3 meq/g and preferably between about 0.8 and about 1.5 meq/g. Examples of suitable layered silicate materials include mica-type layered phyllosilicates, including clays, smectite clays, sodium montmorillonite, sodium hectorite, bentonites, nontronite, Beidelite®, volonsloite, saponite, sauconite, magadite, kenyaite, synthetic sodium hectorites, and the like. Clays of this nature are available from various companies including Southern Clay Products and Nanocor, Inc. The most preferred platelet particles are derived for sodium bentonite or sodium montmorillonite. Such clays are readily available in the U.S., known as Wyoming type montmorillonite, and other parts of the world, including the Kunipia clays available from Kunimine Industries, Inc.

The layered silicate materials are typically treated to improve dispersion into the polymer composition. Many useful clay treatments are known in the art, and these treatments may also be used before, after, or during incorporation of the layered silicate materials into the composites of this invention without deviating from the scope of this invention. Examples of useful treatments include, but are not limited to treatments with silane compounds, expanding agents, polymers and oligomers, dispersing aids, organic cation salts, and their combinations.

Examples of useful treatment with silane compounds include those treatments disclosed in International Publication No. WO 93/11190. Examples of useful silane compounds includes (3-glycidoxypropyl)trimethoxysilane, 2-methoxy(polyethyleneoxy)propyl heptamethyl trisiloxane, octadecyl dimethyl (3-trimethoxysilylpropyl) ammonium chloride and the like.

Examples of useful treatment with expanding agents include oligomeric polymers well known in the art. Representative polymers and oligomers for treating clays include those disclosed in U.S. Pat. Nos. 5,552,469 and 5,578,672. Many dispersing aids are known, covering a wide range of materials including water, alcohols, ketones, aldehydes, chlorinated solvents, hydrocarbon solvents, aromatic solvents, and the like or combinations thereof.

EXAMPLES

General: The invention is further illustrated by the following examples. The glass transition temperatures (Tg's) of the polyesters, polyamides, and blends were determined by ASTM Method D3418 using a TA Instruments 2920 differential scanning calorimeter (DSC) at a scan rate of 20° C./min. Heat Deflection Temperature was determined by ASTM Method D648, and Notched Izod Impact Strength was performed according to ASTM Method D256. Flexural properties were determined according to ASTM Method D790. The tensile properties of the blends were determined according to ASTM Method D638 at 23° C. The inherent viscosity of the polyesters was determined in 60/40 (wt/wt) phenol/tetrachloroethane at a concentration of 0.5 g/100 mL at 25° C. The diol content of the polyester portion of these blends was determined by proton nuclear magnetic resonance spectroscopy ('H NMR). The miscibility of the blends was determined by differential scanning calorimetry of pressed films and molded objects.

Haze values were determined by ASTM Method D1003 (% Haze=100*Diffuse Transmission/Total Transmission) using a HunterLab UltraScan Sphere 8000 Colorimeter manufactured by Hunter Associates Laboratory, Inc., Reston, Va., using Hunter's Universal Software (version 3.8). Calibration and operation of the instrument was carried out according to the HunterLab User Manual. Diffuse transmission was obtained by placing a light trap on the other side of the integrating sphere from the sample port, thus eliminating the straight-thru light path. Only light scattered by greater than 2.5 degrees was measured. Total transmission includes measurement of light passing straight-through the sample and also off-axis light scattered to the sensor by the sample. The sample was placed at the exit port of the sphere so that off-axis light from the full sphere interior is available for scattering. Clarity was determined visually and with haze measurements. For blends and the various compositions of the invention, haze and % transmittance were determined by forming the composition into a sheet, film, or plaque having a thickness of ⅛ inch or less and measuring the haze according to the above procedure. For shaped articles, including multilayer shaped articles, the haze and % transmittance were determined by cutting out a small (i.e., 1×1 cm) section of the article, having a thickness of ⅛ inch or less, and measuring the haze according the procedure described above.

Refractive index was measured at 633 nm with a Metricon Prism Coupler™ model 2010 refractometer (available from Metricon Inc.) and is reported as the average of the refractive indices measured in 3 orthogonal directions (extrusion or stretch, transverse, and thickness directions). Oriented films were produced on a TM Long film stretcher (named for the producer) which uniaxially or biaxially stretches samples of pressed, blown, or extruded film. The operation of the film stretcher was based upon the movement of two drawbars at right angles to each other upon hydraulically driven rods. There was a fixed draw bar opposed to each moving draw bar. These pairs of opposed moving and fixed draw bars, to which the four edges of the film specimen are attached, form the two axes at right angles to each other along which the specimen is stretched in any stretch ratio up to four or seven times original size, depending on the machine being used. Samples were placed in grips on the machine and heated prior to stretching if desired. The outputs from the device are stress versus elongation data (if desired) at the temperature of the experiment and the stretched film.

Oxygen permeabilities of films were determined using Ox-Tran Oxygen Permeation instruments manufactured by MOCON, Inc. Minneapolis, Minn. Oxygen permeabilities were calculated from the known area of the films in test, thickness of the film, partial pressure differential of oxygen across the film, and the measured steady state transmission rate. In the case of samples which exhibit active oxygen scavenging, the measured flux is not truly at steady state, since the transmission rate can slowly change as the efficiency of the oxygen scavenging reaction changes with time. However, in these instances, the oxygen transmission can often be considered to be at pseudo-steady state during the duration of permeation measurement. In the active oxygen scavenger samples included in the examples which follow, little to no change in scavenger efficiency was evident during the course of the measurements and permeabilities were calculated from the measured pseudo-steady state transmission rates.

Comparative Examples 1-12

The copolyesters listed in Table 1 were prepared from terephthalic acid, ethylene glycol, and 1,4-cyclohexanedimethanol (CHDM). The amount of CHDM in the polyesters is shown in Table 1. Example F contains 100% CHDM (0% ethylene glycol) but 26 mole % of the acid portion is isophthalic acid instead of terephthalic acid

TABLE 1

| Polyester | CHDM (mole %) in polyester | Tg | Refractive Index of polyester |
|---|---|---|---|
| A | 1.5 | 81 | 1.5708 |
| B | 31 | 83 | 1.5644 |
| C | 50 | 84 | 1.5593 |
| D | 62 | 86 | 1.5573 |
| E | 81 | 91 | 1.5547 |
| F | 100 | 88 | 1.5519 |

The copolyesters and MXD6 6121 polyamide (containing 100 mole % m-xylylene and 100 mole % adipic acid, available from Mitsubishi Corporation) were dried overnight at 70° C. Each of these copolyesters were bag blended with a MXD6 at 1, 3, and 5 wt % and fed to a Sterling 1.5 inch single screw extruder at 90 rpm under the following temperature settings (degrees C.) to form a blend:

| Zone 1 | Zone 2 | Zone 3 | Zone 4 | Zone 5 |
|---|---|---|---|---|
| 240 | 250 | 260 | 260 | 260 |

The blends were dried overnight at 70° C. and then injection molded into ⅛ inch thick 4" square plaques at 270° C. on a Toyo 90 injection molding machine. The refractive index of the MXD6 was measured to be 1.5824. The resulting haze values and the result of the subtraction of the refractive index of the polyester from the refractive index of the nylon are shown in Table 2:

TABLE 2

| Example | Polyester Type | Polyester (wt %) | MXD6 (wt %) | % Haze | Total Transmission (%) | RI(nylon) – RI(polyester) |
|---|---|---|---|---|---|---|
| C-1 | A | 99 | 1 | 5.2 | 82.8 | 0.0116 |
| C-2 | A | 97 | 3 | 14.3 | 81.6 | 0.0116 |
| C-3 | A | 95 | 5 | 29.8 | 82.0 | 0.0116 |
| C-4 | B | 99 | 1 | 5.1 | 79.5 | 0.0180 |
| C-5 | B | 97 | 3 | 22.4 | 70.7 | 0.0180 |
| C-6 | B | 95 | 5 | 42.9 | 62.4 | 0.0180 |
| C-7 | C | 99 | 1 | 8.5 | 80.7 | 0.0231 |
| C-8 | C | 97 | 3 | 31.0 | 70.4 | 0.0231 |
| C-9 | C | 95 | 5 | 50.7 | 62.6 | 0.0231 |
| C-10 | D | 99 | 1 | 11.5 | 77.6 | 0.0251 |
| C-11 | D | 97 | 3 | 59.0 | 63.3 | 0.0231 |
| C-12 | D | 95 | 5 | 81.6 | 53.5 | 0.0231 |

Examples 13-24, 27-29, 37-32, 34-36, 38 and Comparative Examples 25-26, 30, 33, 36-37, and 39

Nylon 6 (available as Zytel® 7335F from DuPont) and MXD6 (grade 6121) were dried at 120° C. for 48 hours and bag blended in various ratios. Polyamide bag blends were then fed to a Sterling 1.5 inch single screw extruder at 90 rpm under the following conditions (° C.) to form a homogeneous, transamidized blends as indicated by the presence of a single, composition dependent Tg value for each blend. The Tg values are shown in Table 3.

| Zone 1 | Zone 2 | Zone 3 | Zone 4 | Zone 5 |
|---|---|---|---|---|
| 250 | 270 | 300 | 300 | 300 |

Portions of the transamidized nylon blends or MXD6 were dried overnight at 120° C. and then either injection molded into ⅛ inch thick samples at 240° C. on a Toyo 90 injection molding machine or extruded into 15 mil thick film at 240° C. The films were prepared by the following extrusion process: The extruder used was a conventional 2.54 cm diameter Killian extruder, 24:1 L:D (length:diameter) ratio, fitted with a feed screw with 3:1 compression ratio and twisted maddock mixing section. The conventional feedblock was used to convey the melt to a conventional 15.24 cm coathanger die. A 2-roll cast film downstack configuration was used for quenching the melt. These films were then stretched on the TM-Long 4× in each direction at 95° C. The properties of these films before stretching are shown in Table 3 and after stretching are shown in Table 3A. It should be noted that oxygen permeabilities in Tables 3A were measured at 30° C. and 50% relative humidity with 100% O₂ as the test gas.

TABLE 3

Film Properties Before Stretching

| Example | MXD6 (wt %) | Nylon 6 (wt %) | Tg (° C.) | Oxygen Permeability (cc * mil/100 in² * day * atm) | Thickness (mil) | Refractive Index |
|---|---|---|---|---|---|---|
| 13 | 100 | 0 | 88 | 0.533 | 15.003 | 1.5824 |
| 14 | 95 | 5 | 87 | 0.440 | 15.000 | 1.5772 |
| 15 | 90 | 10 | 83 | 0.100 | 14.465 | 1.5739 |
| 16 | 87 | 13 | 83 | 0.063 | 14.498 | 1.5724 |
| 17 | 85 | 15 | 81 | 0.413 | 14.065 | 1.5717 |
| 18 | 75 | 25 | 77 | 1.266 | 15.260 | 1.5655 |
| 19 | 73 | 27 | 76 | 1.060 | 14.065 | 1.5641 |
| 20 | 70 | 30 | 75 | 1.317 | 14.535 | 1.5617 |
| 21 | 65 | 35 | 72 | 1.334 | 14.755 | 1.5599 |
| 22 | 62 | 38 | 72 | 0.740 | 16.385 | 1.5575 |
| 23 | 60 | 40 | 70 | 0.709 | 14.630 | 1.5536 |
| 24 | 0 | 100 | 44 | | | 1.5318 |

TABLE 3A

Film Properties After Stretching

| Example | MXD6 (wt %) | Nylon 6 (wt %) | Oxygen Permeability (cc * mil/ (100 in² * day * atm)) | Thickness (mil) |
|---|---|---|---|---|
| 13 | 100 | 0 | 0.230 | 0.900 |
| 14 | 95 | 5 | 0.238 | 0.930 |
| 15 | 90 | 10 | 0.263 | 0.850 |
| 16 | 87 | 13 | 0.340 | 0.860 |
| 17 | 85 | 15 | 0.325 | 0.820 |
| 18 | 75 | 25 | 0.499 | 0.900 |
| 19 | 73 | 27 | 1.402 | 0.885 |
| 20 | 70 | 30 | 0.622 | 0.880 |
| 21 | 65 | 35 | 0.215 | 0.970 |
| 22 | 62 | 38 | 0.847 | 1.095 |
| 23 | 60 | 40 | 0.982 | 0.995 |
| 24 | 0 | 100 | | |

To generate examples and comparative examples shown in Table 4, portions of the transamidized blends or MXD6 were dried overnight between 70 and 120° C. and then compounded with the polyesters of Table 1. The polyesters were dried overnight between 70 and 120° C. Each of these polyesters of Table 1 were bag blended with 10 wt % of selected transamidized blends of Table 3 or MXD6 and fed to a Sterling 1.5 inch single screw extruder at 90 rpm under the following temperature settings (° C.) to form an immiscible blend:

| Zone 1 | Zone 2 | Zone 3 | Zone 4 | Zone 5 |
|---|---|---|---|---|
| 240 | 260 | 280 | 280 | 280 |

The blends were dried overnight at 70° C. and then injection molded into ⅛ inch thick 4" square plaques at 270° C. on a Toyo 90 injection molding machine. The resulting haze values and the result of the subtraction of the refractive index of the polyester from the refractive index of the nylon are shown in Table 4.

To generate example 38 and comparative example C-39, the transamidized blend from example 20 of Table 3 was dried overnight at 70° C. and then bag blended with either polyester A or C of Table 1. The polyesters were also dried overnight between 70 and 120° C. The bag blends were then injection molded into ⅛ inch thick 4" square plaques at 270° C. on a Toyo 90 injection molding machine. The resulting haze values and the results of the subtraction of the refractive index of the polyester from the refractive index of MXD6 or the nylon blends are shown in Table 4.

wt % of either these transamidized MXD6/N6 preblends or MXD6 were bag blended with several of the copolyesters from Table 1 as per Table 6. These pellet blends were then dried overnight at 60° C.-70° C. and then fed to a Killian 1.0 inch single screw extruder at 95 rpm at the temperatures indicated in table 7 to form nominally 30 mil thick films from the immiscible blend. All films containing pure MXD6 had

TABLE 4

Polyester blends with homogeneous MXD6/Nylon 6 blends

| Example | Polyester Type | Blend Example of Table 3 | CHDM (mole %) in polyester | Blend MXD6 (wt %) | Blend Nylon 6 (wt %) | Haze % | Total % Trans. | RI(nylon) − RI(polyester) |
|---|---|---|---|---|---|---|---|---|
| C-25 | A | 13 | 1.5 | 100 | 0 | 28.1 | 71.1 | 0.0116 |
| C-26 | A | 14 | 1.5 | 95 | 5 | 13.5 | 76.0 | 0.0064 |
| 27 | A | 15 | 1.5 | 90 | 10 | 6.3 | 77.8 | 0.0031 |
| 28 | A | 16 | 1.5 | 87 | 13 | 6.9 | 78.1 | 0.0016 |
| 29 | A | 17 | 1.5 | 85 | 15 | 7.7 | 77.9 | 0.0009 |
| C-30 | B | 17 | 31 | 85 | 15 | 21.3 | 81.8 | 0.0073 |
| 31 | B | 18 | 31 | 75 | 25 | 5.0 | 86.5 | 0.0011 |
| 32 | B | 19 | 31 | 73 | 27 | 8.5 | 85.4 | −0.0003 |
| C-33 | B | 20 | 31 | 70 | 30 | 16.2 | 84.1 | −0.0027 |
| 34 | C | 20 | 50 | 70 | 30 | 4.1 | 86.8 | 0.0024 |
| 36 | C | 21 | 50 | 65 | 35 | 8.3 | 84.5 | 0.0006 |
| C-36 | C | 22 | 50 | 62 | 38 | 13.6 | 82.8 | −0.0018 |
| C-37 | C | 23 | 50 | 60 | 40 | 19.3 | 80.2 | −0.0057 |
| 38 | C | 20 | 50 | 70 | 30 | 3.7 | 86.3 | 0.0024 |
| C-39 | A | 20 | 3.5 | 70 | 30 | 33.0 | 69.9 | −0.0091 |

Example 40

In this prophetic example, a synthetic route to a polyamide with the appropriate refractive index is employed instead of blending two polyamides as in the above Examples 13-24. Any method known in the art can be used to produce these directly synthetic polyamides. The polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80 to 120° C., until the ester is converted to an amide. The mixture is then heated to the polymerization temperature. For this prophetic example, the polyamide synthesized is poly(m-xylene pimelamide) which is synthesized from the diamine m-xylylenediamine and the diacid pimelic acid. This polyamide is then blended with 90 wt % of the copolyester A in Table 1, in accordance with methods disclosed in Examples 25-39. The difference in refractive index between these the copolyester A and poly(m-xylylene pimelamide) is predicted to be 0.0034 and is predicted to be transparent. The resulting blend is predicted to have a haze value of less 10% and a transmittance of greater than 75%.

Examples 42-43 and 47-49 and Comparative Examples 41, 44-46, and 50-53

Monolayer Films of Blends and Oxygen-Scavenging Compositions

Several MXD6/N6 transamidized blends were prepared in the manner discussed above for examples 13-24 and are given in Table 5. The refractive index values listed in Table 5 were measured on 15 mil films of these transamidized blends in the manner discussed above for examples 13-24. Three wt % or 5 haze values greater than 10%. The films where the refractive index of nylon blend was matched to the refractive index of corresponding polyester within a range of 0.006 to −0.0006 were clear (haze≦10%).

TABLE 5

Homogeneous MXD6 - Nylon 6 Blends

| Nylon | Composition | Refractive Index | Tg (° C.) |
|---|---|---|---|
| W - | Transamidized MXD6/23 wt % Nylon 6 preblend | 1.5650 | 78 |
| X - | Transamidized MXD6/30 wt % Nylon 6 preblend | 1.5617 | 75 |
| Y - | Transamidized MXD6/41 wt % Nylon 6 preblend | 1.5528 | 70 |
| Z - | Transamidized MXD6/50 wt % Nylon 6 preblend | 1.5472 | 66 |
| MXD6 | MXD6 | 1.5824 | 88 |

To produce oxygen-scavenging compositions, a concentrate containing cobalt neodecanoate was added to two of the films. This concentrate was prepared as follows. Separate feeds of polyester type C and cobalt neodecanoate, in the form of a pastille and supplied as Cobalt Ten-Cem™ 22.5% (available from OMG Corp.) were fed into a 57 mm twin-screw extruder and melt blended at barrel set points of approximately 235° C. Molten polymer exited the extruder in the form of approximate 0.08" diameter strands which were water quenched and cut into approximate 0.125" length pellets. The ratio (by weight) of polyester to polyamide to concentrate was 93:5 to 5 to 1.5 and the concentration of cobalt metal in the concentrate was such that this ratio resulted in about 140 to 150 ppm cobalt in the final blended film. The samples which contained cobalt exhibited excellent oxygen scavenging capacity. These samples, which were mounted on the Ox-Tran permeation instrument 1 week after extrusion, had average apparent permeabilities under these conditions of less than 0.15 cc(STP)*mil/100 in$^2$/day/atm for over 6 months.

TABLE 6

30 mil Monolayer Film Results

| Example | Polyester | Nylon | Melt Temp | % Haze | Total Trans. (%) | RI(nylon) – RI(polyester) | Oxygen Permeability* |
|---|---|---|---|---|---|---|---|
| C-41 | B | 3% MXD6 | 250° C. | 22.72 | 88.1 | 0.0180 | |
| 42 | B | 3% W | 250° C. | 1.13 | 90.5 | 0.0006 | |
| 43 | C | | 250° C. | 0.47 | 90.8 | n/a | 25.06 |
| C-44 | C | 3% MXD6 | 250° C. | 35.90 | 87.8 | 0.0231 | |
| C-45 | C | 5% MXD6 | 280° C. | 53.57 | 87.7 | 0.0231 | 13.62 |
| C-46 | C | 5% MXD6 + Co | 280° C. | 34.12 | 86.2 | 0.0231 | 0.20 |
| 47 | C | 3% X | 250° C. | 1.00 | 90.7 | 0.0024 | |
| 48 | C | 5% X | 280° C. | 0.98 | 90.6 | 0.0024 | 20.70 |
| 49 | C | 5% X + Co | 280° C. | 1.10 | 90.4 | 0.0024 | 0.09 |
| C-50 | E | 3% MXD6 | 290° C. | 27.12 | 85.6 | 0.0277 | |
| C-51 | E | 3% Y | 290° C. | 2.99 | 90.8 | −0.0019 | |
| C-52 | F | 3% MXD6 | 250° C. | 64.06 | 87.9 | 0.0305 | |
| C-53 | F | 3% Z | 250° C. | 2.28 | 92.3 | −0.0047 | |

*apparent permeabilities (average of 2 films per composition and 3 permeability measures per film) fifteen days after mounting on the instrument measured at 23° C. and about 60 to 80% relative humidity using air as the upstream test gas.

Example 56 and Comparative Examples 54-55

Regrind of Multilayer Films

Multilayer films were prepared by co-extruding two 15 mil layers of polyester C around a 4 mil thick layer of either MXD6 or transamidized MXD6/30 wt % N6 blend "X." This is referred to as an "ABA" structure where the "A" layers are the outer layers and the "B" layer is the interior layer. A Killian 1" extruder was used to extrude the outer layers from polyester C at a temperature of 265° C. A 0.75" Killian extruder was used to extrude the inner layers at a temperature of 285° C. for the MXD6 and 275° C. for the transamidized MXD6/30 wt % Nylon 6 blend "X." In order to simulate the reuse of these multilayer films as regrind in a monolayer structure, these multilayer films were then ground up and dry blended with additional polyester C pellets at a 50/50 ratio. This dry blend was then dried at 70 C and extruded on a Killian 1" extruder at a temperature of 240° C. into 20 mil films. Haze values in table 7. The coextruded films all have haze values less than 2%. However, when these films are reground and blended with neat polyester "C," the film containing the C/MXD6 regrind blend the values increase above 10%. The film containing the "C/X" regrind remains clear.

TABLE 7

| | | 30 mil ABA Coextruded Films (4 mil B layer) | | 20 mil Monolayer films produced from a mixture of 50% "C" pellets with 50% ground coextruded film | | |
|---|---|---|---|---|---|---|
| Example | Materials | Haze (%) | Total Transmittance (%) | Haze (%) | Total Transmittance (%) | RI(nylon) – RI(polyester) |
| C-54 | C | 0.12 | 91.5 | 0.09 | 91.5 | n/a |
| C-55 | C/MXD6/C | 1.49 | 91.1 | 16.44 | 87.3 | 0.0231 |
| 56 | C/X/C | 0.62 | 91.2 | 0.37 | 91.5 | 0.0022 |

Example and Comparative Examples 57 and 58

Adhesion of Multilayer Films

ABA films were prepared by co-extruding two 15 mil layers of polyester C around a 4 mil thick layer of either MXD6 or transamidized MXD6/30 wt % N6 blend "X." The Nylon 6 used in the transamidized blend in this example was Zytel 7301. A Killian 1" extruder was used to extrude the outer polyester C layers at a temperature of 265° C. A 0.75" Killian extruder was used to extrude the inner layers at the temperatures indicated in Table 8. The transamidized MXD6/30 wt % N6 blend "X" shows superior adhesion over MXD6 to polyester C. Furthermore, improved adhesion of the transamidized MXD6/30 wt % N6 blend to polyester C was obtained when the inner layer melt temperature was increased from 280° C. to 285° C. MXD6 adhesion did not show any temperature dependency.

TABLE 8

| Example | Materials | "B" layer melt temperature | Average Peel Strength g/mm |
|---|---|---|---|
| C-57 | C/MXD6/C | 270° C. | 1.74 |
| | | 280° C. | 1.7 |
| | | 285° C. | 1.88 |
| 58 | C/X/C | 270° C. | 4.33 |
| | | 280° C. | 4.42 |
| | | 285° C. | 7.14 |

What is claimed is:

1. A polymer composition, comprising an immiscible blend of:

(i) a first component comprising at least one polyester comprising: (a) diacid residues comprising at least 80 mole percent of the residues of at least one dicarboxylic acid selected from the group consisting of terephthalic acid, isophthalic acid, naphthalenedicarboxylic acid, and 1,4-cyclohexanedicarboxylic acid, and 0 to about 20 mole percent of the residues of at least one dicarboxylic acid having 2 to 20 carbon atoms, each based on the total moles of diacid residues; and (b) diol residues comprising at least 80 mole percent of the residues of at least one diol selected from the group consisting of ethylene glycol, 1,4-cyclohexanedimethanol; neopentyl glycol, diethylene glycol, 1,3-propanediol, 1,4-butanediol, and, 2,2,4,4-tetramethyl-1,3-cyclobutanediol, and from 0 to about 20 mole percent of the residues of at least one diol having from 3 to 16 carbons, each based on the total moles of diol residues; and (ii) a second component comprising a homogeneous, transamidized blend of at least two polyamides;

wherein said second component (ii) and said first component (i) have a difference in refractive index, RI(second component)−RI(first component), of about 0.006 to about −0.0006, and said immiscible blend has a percent transmittance of at least 75%, and a haze of 10% or less.

2. The composition of claim 1 wherein said diacid residues comprise the residues of at least one dicarboxylic acid selected from the group consisting of terephthalic acid and isophthalic acid, and said diol residues comprise the residues of at least one diol selected from the group consisting of ethylene glycol, 1,4-cyclohexanedimethanol, and neopentyl glycol.

3. The composition of claim 2 wherein said polyester comprises: (a) at least 80 mole percent of the residues of terephthalic acid and (b) at least 80 mole percent of the residues of ethylene glycol.

4. The composition of claim 3 which comprises about 50 to about 99 weight percent of said first component (i) and about 50 to about 1 weight percent of said second component (ii), based on the total weight of said composition.

5. The composition of claim 1 which further comprises about 0.1 to about 2 mole percent of the residues of at least one branching agent selected from the group consisting of trimellitic acid, trimellitic anhydride, and pyromellitic dianhydride, based on the total moles of diacid residues.

6. The composition of claim 1 wherein said homogeneous, transamidized blend of said second component (ii) comprises a first polyamide, comprising aromatic residues, and a different, second polyamide comprising aliphatic residues.

7. The composition of claim 6 wherein said first polyamide comprises the residues of m-xylylenediamine and adipic acid, and said second polyamide comprises the residues of at least one aliphatic or cycloaliphatic monomer selected from the group consisting of adipic acid, pimelic acid, suberic acid, azelaic acid, sebacic acid, undecanedioc acid, dodecanedioc acid, caprolactam, butyrolactam, 11-aminoundecanedioc acid, and hexamethylene diamine.

8. The composition of claim 6 wherein said second polyamide comprises nylon 6, nylon 6,6, or mixtures thereof.

9. A polymer composition, comprising:
(A) an immiscible blend of:
(i) a first component comprising at least one polyester comprising: (a) diacid residues comprising at least 80 mole percent of the residues of at least one dicarboxylic acid selected from the group consisting of terephthalic acid, isophthalic acid, naphthalenedicarboxylic acid, and 1,4-cyclohexanedicarboxylic acid, and 0 to about 20 mole percent of the residues of at least one dicarboxylic acid having 2 to 20 carbon atoms, each based on the total moles of diacid residues; and (b) diol residues comprising at least 80 mole percent of the residues of at least one diol selected from the group consisting of ethylene glycol, 1,4-cyclohexanedimethanol, neopentyl glycol, diethylene glycol, 1,3-propanediol, 1,4-butanediol, and, 2,2,4,4-tetramethyl-1,3-cyclobutanediol, and from 0 to about 20 mole percent of the residues of at least one diol having from 3 to 16 carbons, each based on the total moles of diol residues; and (ii) a second component comprising a homogeneous, transamidized blend of at least two polyamides; and (B) at least one metal selected from Groups 3-12, Rows 4-6 of the Periodic Table of elements, wherein said second component (ii) and said first component (i) have a difference in refractive index, RI(second component)−RI(first component), of about 0.006 to about −0.0006, and said immiscible blend has a percent transmittance of at least 75%, and a haze of 10% or less.

10. The composition of claim 9 wherein said diacid residues comprise the residues of one or more dicarboxylic acids selected from the group consisting of terephthalic acid and isophthalic acid, and said diol residues comprise the residues of one or more diols selected from the group consisting of ethylene glycol, 1,4-cyclohexanedimethanol, and neopentyl glycol.

11. The composition of claim 10 wherein said polyester comprises: (a) at least 80 mole percent of the residues of terephthalic acid and (b) at least 80 mole percent of the residues of ethylene glycol.

12. The composition of claim 11 which comprises about 50 to about 99 weight percent of said first component (i) and about 50 to about 1 weight percent of said second component (ii), based on the total weight of said composition.

13. The composition of claim 9 which further comprises about 0.1 to about 2 mole percent of the residues of at least one branching agent selected from the group consisting of trimellitic acid, trimellitic anhydride, and pyromellitic dianhydride, based on the total moles of diacid residues.

14. The composition of claim 9 wherein said homogeneous, transamidized blend of said second component (ii) comprises a first polyamide, comprising aromatic residues, and a different, second polyamide comprising aliphatic residues.

15. The composition of claim 14 wherein said first polyamide comprises the residues of m-xylylenediamine and adipic acid, and said second polyamide comprises the residues of at least one aliphatic or cycloaliphatic monomer selected from the group consisting of adipic acid, pimelic acid, suberic acid, azelaic acid, sebacic acid, undecanedioc acid, dodecanedioc acid, caprolactam, butyrolactam, 11-aminoundecanedioc acid, and hexamethylene diamine.

16. The composition of claim 14 wherein said second polyamide comprises nylon 6, nylon 6,6, or mixtures thereof.

17. A shaped article comprising the composition of any one of claim 1, 3, 9, or 11.

18. The shaped article of claim 17 which is formed by extrusion, calendering, thermoforming, blow-molding, extrusion blow-molding, injection molding, compression molding, casting, drafting, tentering, or blowing.

19. The shaped article of claim 18 which is a sheet, film, tube, preform, or bottle.

* * * * *